US012783861B2

(12) United States Patent
Lin et al.

(10) Patent No.: US 12,783,861 B2
(45) Date of Patent: Nov. 3, 2026

(54) DATA PROCESSING APPARATUS AND METHOD FOR EXECUTING NEURAL NETWORK MODEL, AND RELATED PRODUCTS

(71) Applicant: CAMBRICON TECHNOLOGIES CORPORATION LIMITED, Beijing (CN)

(72) Inventors: Xiaodong Lin, Beijing (CN); Zhenggang Tang, Beijing (CN); Shuai Jiao, Beijing (CN); Haizhao Luo, Beijing (CN); Xiong Zhang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 979 days.

(21) Appl. No.: 18/013,936

(22) PCT Filed: Dec. 30, 2021

(86) PCT No.: PCT/CN2021/143160
§ 371 (c)(1),
(2) Date: Aug. 15, 2023

(87) PCT Pub. No.: WO2022/143916
PCT Pub. Date: Jul. 7, 2022

(65) Prior Publication Data

US 2025/0348720 A1 Nov. 13, 2025

(30) Foreign Application Priority Data

Dec. 31, 2020 (CN) ......................... 202011624955.6
Dec. 31, 2020 (CN) ......................... 202011631707.4
Dec. 31, 2020 (CN) ......................... 202011631736.0

(51) Int. Cl.
*G06N 3/063* (2023.01)
*G06N 3/0464* (2023.01)
*G06N 3/084* (2023.01)

(52) U.S. Cl.
CPC ........... *G06N 3/063* (2013.01); *G06N 3/0464* (2023.01); *G06N 3/084* (2013.01)

(58) Field of Classification Search
CPC ....... G06N 3/063; G06N 3/0464; G06N 3/084
See application file for complete search history.

(56) References Cited

U.S. PATENT DOCUMENTS

2019/0163716 A1* 5/2019 Li ........................... G06F 17/15
2019/0163717 A1* 5/2019 Li ......................... G06F 17/153
(Continued)

FOREIGN PATENT DOCUMENTS

CN 107729994 A 2/2018
CN 107832842 A 3/2018
(Continued)

OTHER PUBLICATIONS

Office action issued on Mar. 11, 2025 from China Patent Office in a counterpart China Patent Application No. 202011631707.4 (all the cited references are listed in this IDS.) (English translation is also submitted herewith.).
(Continued)

*Primary Examiner* — Kenneth B Lee, Jr.
(74) *Attorney, Agent, or Firm* — The PL Law Group, PLLC

(57) ABSTRACT

A data processing apparatus may be included in a combined processing apparatus as a computing apparatus. The combined processing apparatus may further include an interface apparatus and other processing apparatus. The computing apparatus interacts with other processing apparatus to jointly complete a computing operation specified by a user. The
(Continued)

combined processing apparatus may further include a storage apparatus. The storage apparatus is connected to the computing apparatus and other processing apparatus, respectively. The storage apparatus is configured to store data of the computing apparatus and other processing apparatus. The solution optimizes a convolution operation of a multi-dimensional array and improves operation processing efficiency.

20 Claims, 14 Drawing Sheets

(56) References Cited

U.S. PATENT DOCUMENTS

| | | | | |
|---|---|---|---|---|
| 2019/0164045 | A1* | 5/2019 | Li | G06N 3/063 |
| 2019/0311243 | A1 | 10/2019 | Whatmough et al. | |
| 2020/0160226 | A1* | 5/2020 | Ross | G06F 17/153 |
| 2020/0184002 | A1 | 6/2020 | Sakharshete et al. | |
| 2020/0210806 | A1* | 7/2020 | Lee | G06N 3/0464 |
| 2020/0280717 | A1 | 9/2020 | Li et al. | |

FOREIGN PATENT DOCUMENTS

| | | | |
|---|---|---|---|
| CN | 107844827 | A | 3/2018 |
| CN | 108918965 | A | 11/2018 |
| CN | 111667051 | A | 9/2020 |
| CN | 111967594 | A | 11/2020 |
| JP | 2019-102082 | A | 6/2019 |
| JP | 2019-125351 | A | 7/2019 |
| JP | 2019-125352 | A | 7/2019 |
| JP | 2020-126597 | A | 8/2020 |
| KR | 10-2016-0143548 | A | 12/2016 |
| KR | 10-2019-0054770 | A | 5/2019 |
| KR | 10-2019-0062305 | A | 6/2019 |
| WO | WO 2018/071546 | A1 | 4/2018 |

OTHER PUBLICATIONS

Shen Diyu et al., "Miniaturized folded tri-band bandpass filter based on multidirectional-feed coupling", Journal of Terahertz Science and Electronic Information Technology, vol. 18, No. 6, 2020, pp. 1030-1034 (English Abstract is included in the first page.).

Martin Danelljan et al., "ECO: Efficient Convolution Operators for Tracking", IEEE Conference on Computer Vision and Pattern Recognition, 2017, pp. 6931-6939, DOI 10.1109/CVPR.2017.733.

Office action issued on Mar. 29, 2025 from China Patent Office in a counterpart China Patent Application No. 202011624955.6 (all the cited references are listed in this IDS.) (English translation is also submitted herewith.).

Zhang Jun-Yang et al., "Parallel computing method for two-dimensional matrix convolution", Journal of Zhejiang University (Engineering Science) , vol. 52, No. 3, 2018 (English Abstract is included in the first page.).

Narjes Rohani et al., "Drug-Drug Interaction Predicting by Neural Network Using Integrated Similarity", Scientific Reports, 2029, pp. 1-11, https://doi.org/10.1038/s41598-019-50121-3.

Office action issued on Apr. 1, 2025 from Korean Patent Office in a counterpart Korean Patent Application No. 10-2022-7046207 (all the cited references are listed in this IDS.) (English translation is also submitted herewith.).

Office action issued on Mar. 31, 2025 from China Patent Office in a counterpart China Patent Application No. 202011631736.0 (English translation is also submitted herewith.).

European Search Report for EP21914646.1 issued on Nov. 11, 2024 from European patent office in a counterpart European patent application.

International Search Report for PCT/CN2021/143160 mailed on Mar. 28, 2022.

Office action issued on Dec. 26, 2023 from Japan Intellectual Property Office in a counterpart Japanese Patent Application No. 2022-581659 (all the cited references are listed in this IDS.) (English translation is also submitted herewith.).

Masahiro Hiramori et al., "Evaluation of embedded deep learning frameworks", Information Processing Society of Japan, vol. 2020-OS-148, No. 4 , pp. 1-6, ISSN 2188-8795 (English translation of Abstract is submitted herewith.).

Taitaka Kondo et al. "High speed of Resnet50 in Intel HD Graphics", SIG Technical Reports, 2020, vol. 2020-HPC-177, No. 2, pp. 1-6, ISSN 2188-8841 (English translation of Abstract is submitted herewith.).

Hongjie Xu et al., "Convolution computing accelerator to reduce memory capacity by efficient accumulation of partial products", Information Processing Society of Japan DA symposium 2020 Collected papers, August, vol. 2020, pp. 28-35 (English translation of Abstract is submitted herewith.).

* cited by examiner

DATA PROCESSING APPARATUS AND METHOD FOR EXECUTING NEURAL NETWORK MODEL, AND RELATED PRODUCTS

CROSS REFERENCE OF RELATED APPLICATIONS AND CLAIM OF PRIORITY

This application claims benefit under 35 U.S.C. 119, 120, 121, or 365(c), and is a National Stage entry from International Application No. PCT/CN2021/143160, filed Dec. 30, 2021, which claims priority to the benefit of Chinese Patent Application No. 2020116317360 filed on Dec. 31, 2020; Chinese Patent Application No. 2020116317074 filed on Dec. 31, 2020; and Chinese Patent Application No. 2020116249556 filed on Dec. 31, 2020, the entire contents of which are incorporated herein by reference.

BACKGROUND

1. Technical Field

The present disclosure generally relates to the field of data processing. More specifically, the present disclosure relates to a data processing apparatus and a data processing method for executing a neural network model, a chip, and a board card.

2. Background Art

At present, deep learning has become an important branch of machine learning and greatly promotes the development of artificial intelligence (AI). Deep neural network (DNN), as the core technology of the deep learning, has been widely used in many industries.

Convolution layer, as one of common hidden layers in a neural network model, extracts features of input data through a convolution operation. A lot of convolution operations are included in the neural network model, and computing performance of the convolution operations greatly affects computing performance of the whole neural network model. During the convolution operation, for each dimension of a filter in the convolution layer, there are requirements for both instruction alignment and hardware (such as a parallel operator) alignment. Therefore, the convolution operation is required to be optimized to improve the computing performance of the neural network model.

SUMMARY

To at least solve one or more technical problems mentioned before, the present disclosure provides a data processing solution for executing a neural network model in many aspects. Specifically, the data processing solution may effectively improve computing performance of a convolution operation by changing the filter of a convolution layer. The neural network model of embodiments of the present disclosure may be applied to various fields, such as image processing, speech processing, text processing, and the like, and these processing, for example, may include but are not limited to identification and classification.

A first aspect of the present disclosure provides a data processing apparatus for executing a neural network model, including: a storage circuit configured to store a folding filter of a convolution layer of the neural network model, where the folding filter is obtained through a dimension folding by an original filter, where the dimension folding includes rearranging data of a width dimension and/or a height dimension to an input channel dimension; and a processing circuit configured to: perform a dimension folding on an input feature map to obtain a folding feature map; and use the folding filter to perform a convolution operation on the folding feature map to obtain an output feature map.

A second aspect of the present disclosure provides a chip, including the data processing apparatus of any embodiment of the first aspect.

A third aspect of the present disclosure provides a board card, including the chip of any embodiment of the second aspect.

A fourth aspect of the present disclosure provides a method for executing a neural network model, which is implemented by a data processing apparatus, where the data processing apparatus includes a storage circuit and a processing circuit, and the method includes: performing, by the processing circuit, a dimension folding on an input feature map to obtain a folding feature map; and using, by the processing circuit, a folding filter of a convolution layer of the neural network model stored in the storage circuit to perform a convolution operation on the folding feature map to obtain an output feature map, where the folding filter is obtained through a dimension folding by an original filter, where the dimension folding includes rearranging data of a width dimension and/or a height dimension to an input channel dimension.

Through the data processing apparatus, the chip, the board card, and the data processing method implemented by the data processing apparatus provided above, the solution of the present disclosure optimizes the convolution operation through the folding filter. Embodiments of the present disclosure are especially suitable for a case where both sizes of output channel dimension and input channel dimension of the original filter are relatively small. During a conventional convolution operation, when the size of output channel dimension of the filter is relatively small, a large waste of resources will be caused due to the limitation of quantity alignment of parallel operation units. However, when the size of input channel dimension of the filter is relatively small, much redundant computing will be caused due to the limitation of vectorization alignment of artificial intelligence chip instruction sets. On the one hand, in the embodiments of the present disclosure, by folding the original filter in a first dimension, a plurality of extended filters obtained after moving a convolution stride for many times may be used to be synthesized into one folding filter to extend the output channel dimension, thereby fully utilizing available parallel operation units. On the other hand, in the embodiments of the present disclosure, by folding the filter in a second dimension, data of the width dimension and/or the height dimension of the convolution kernel may be folded to the input channel dimension to satisfy the requirements for instruction alignment, thereby decreasing redundant computing as much as possible. The above two aspects may be combined, thereby avoiding the waste of operation resources most effectively and improving the computing performance of the convolution operation in hardware acceleration.

BRIEF DESCRIPTION OF THE DRAWINGS

By reading following detailed descriptions with reference to drawings, the above and other objects, features and technical effects of exemplary embodiments of the present disclosure will become easier to understand. In the drawings, several embodiments of the present disclosure are shown in an exemplary but not a restrictive manner, and the same or corresponding reference numerals indicate the same or corresponding parts.

DETAILED DESCRIPTION OF THE EMBODIMENTS

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" appear in the claims, specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that terms used in the specification of the present disclosure are merely intended to describe specific embodiments rather than to limit the present disclosure. As being used in the specification and the claims of the disclosure, unless the context clearly indicates otherwise, singular forms "a", "an", and "the" are intended to include plural forms. It should also be understood that the term "and/or" used in the specification and the claims refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context. Similarly, depending on the context, a clause "if it is determined that" or "if [a described condition or event] is detected" may be interpreted as "once it is determined that", or "in response to a determination", or "once [a described condition or event] is detected", or "in response to a case where [a described condition or event] is detected".

Specific implementations of the present disclosure will be described in detail in combination with drawings below.

Figure 1:
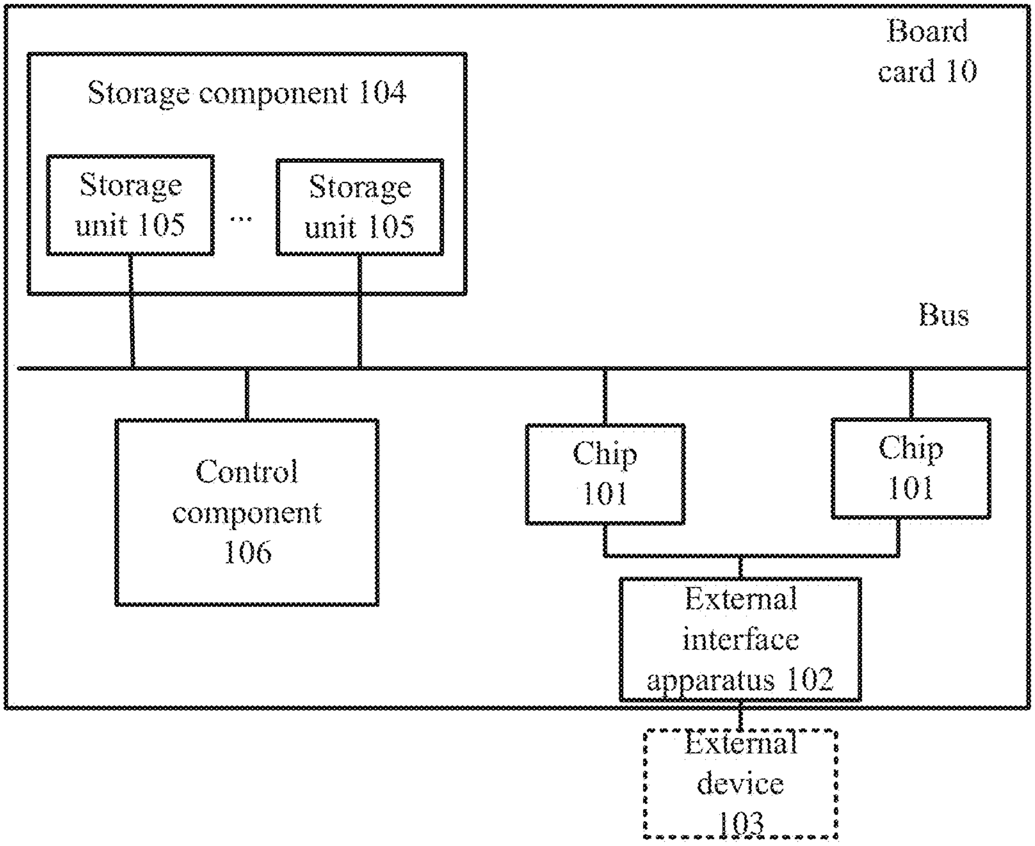
FIG. 1 is a structural diagram of a board card according to an embodiment of the present disclosure.

FIG. 1 is a structural diagram of a board card 10 according to an embodiment of the present disclosure. As shown in FIG. 1, board card 10 includes a chip 101, which is a system on chip (SoC), or called an on-chip system, and integrates one or a plurality of combined processing apparatuses. The combined processing apparatus is an artificial intelligence operation unit, which is used to support various deep learning algorithms and various machine learning algorithms and meet requirements of intelligent processing in complex scenarios in computer vision, speech, natural language processing, data mining, and other fields. In particular, deep learning technology is widely used in the field of cloud intelligence. A notable feature of cloud intelligence applications is a large amount of input data, which has high requirements for storage capacity and computing power of a platform. The board card 10 of this embodiment is suitable for cloud intelligent applications and has a huge off-chip storage, a huge on-chip storage, and great computing power.

The chip 101 is connected to an external device 103 through an external interface apparatus 102. The external device 103, for example, may be a server, a computer, a camera, a monitor, a mouse, a keyboard, a network card, or a WIFI interface. To-be-processed data may be transmitted from the external device 103 to the chip 101 through the external interface apparatus 102. A computing result of the chip 101 may be transmitted back to the external device 103 through the external interface apparatus 102. According to different application scenarios, the external interface apparatus 102 may have different interface forms such as a standard peripheral component interface express (PCIe) interface, and the like.

The board card 10 further includes a storage component 104 used for storing data. The storage component 104 includes one or more storage units 105. The storage component 104 is connected to and transfers data to a control component 106 and the chip 101 through a bus. Control component 106 in board card 10 is configured to regulate and control a state of the chip 101. As such, in an application scenario, the control component 106 may include a micro controller unit (MCU).

Figure 2:
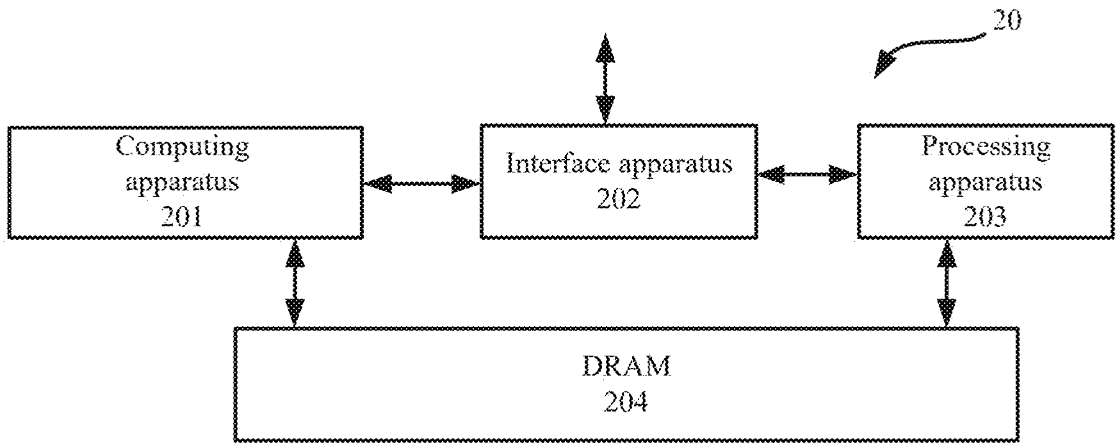
FIG. 2 is a structural diagram of an integrated circuit apparatus according to an embodiment of the present disclosure.

FIG. 2 is a structural diagram of a combined processing apparatus in the chip 101 of this embodiment. As shown in FIG. 2, the combined processing apparatus 20 includes a computing apparatus 201, an interface apparatus 202, a processing apparatus 203, and a dynamic random-access memory (DRAM) 204.

The computing apparatus 201 is configured to perform an operation specified by a user and is mainly implemented as a single-core intelligent processor or a multi-core intelligent processor. Computing apparatus 201 is used to perform computing of deep learning or machine learning and interacts with the processing apparatus 203 through the interface apparatus 202 to jointly complete the operation specified by the user.

The interface apparatus 202 is used to transfer data and control instructions between the computing apparatus 201 and the processing apparatus 203. For example, the computing apparatus 201 may acquire input data from the processing apparatus 203 via the interface apparatus 202 and write the input data to an on-chip storage apparatus of the computing apparatus 201. Further, the computing apparatus 201 may acquire the control instructions from the processing apparatus 203 via the interface apparatus 202 and write the control instructions to an on-chip control cache of the computing apparatus 201. Alternatively, or optionally, the interface apparatus 202 may further read data in the storage apparatus of the computing apparatus 201 and then transfer the data to the processing apparatus 203.

The processing apparatus 203 serves as a general processing apparatus and performs basic controls that include but are not limited to moving data, starting and/or stopping the computing apparatus 201. According to different implementations, the processing apparatus 203 may be a central processing unit (CPU), a graphics processing unit (GPU), or one or more of other general and/or dedicated processors. These processors include but are not limited to a digital signal processor (DSP), an application specific integrated circuit (ASIC), a field-programmable gate array (FPGA), or other programmable logic components, discrete gate or transistor logic components, discrete hardware components, and the like. Moreover, a count of the processors may be determined according to actual requirements. As described above, with respect to the computing apparatus 201 of the present disclosure only, the computing apparatus 201 of the present disclosure may be viewed as having a single-core structure or an isomorphic multi-core structure. However, when the computing apparatus 201 and the processing apparatus 203 are considered together, both the computing apparatus 201 and the processing apparatus 203 may be viewed as forming a heterogeneous multi-core structure.

The DRAM 204 is used for storing to-be-processed data. The DRAM 204 is a double data rate (DDR) memory with a size of 16G or more than 16G generally. The DRAM 204 is used for saving data of the computing apparatus 201 and/or the processing apparatus 203.

Figure 3:
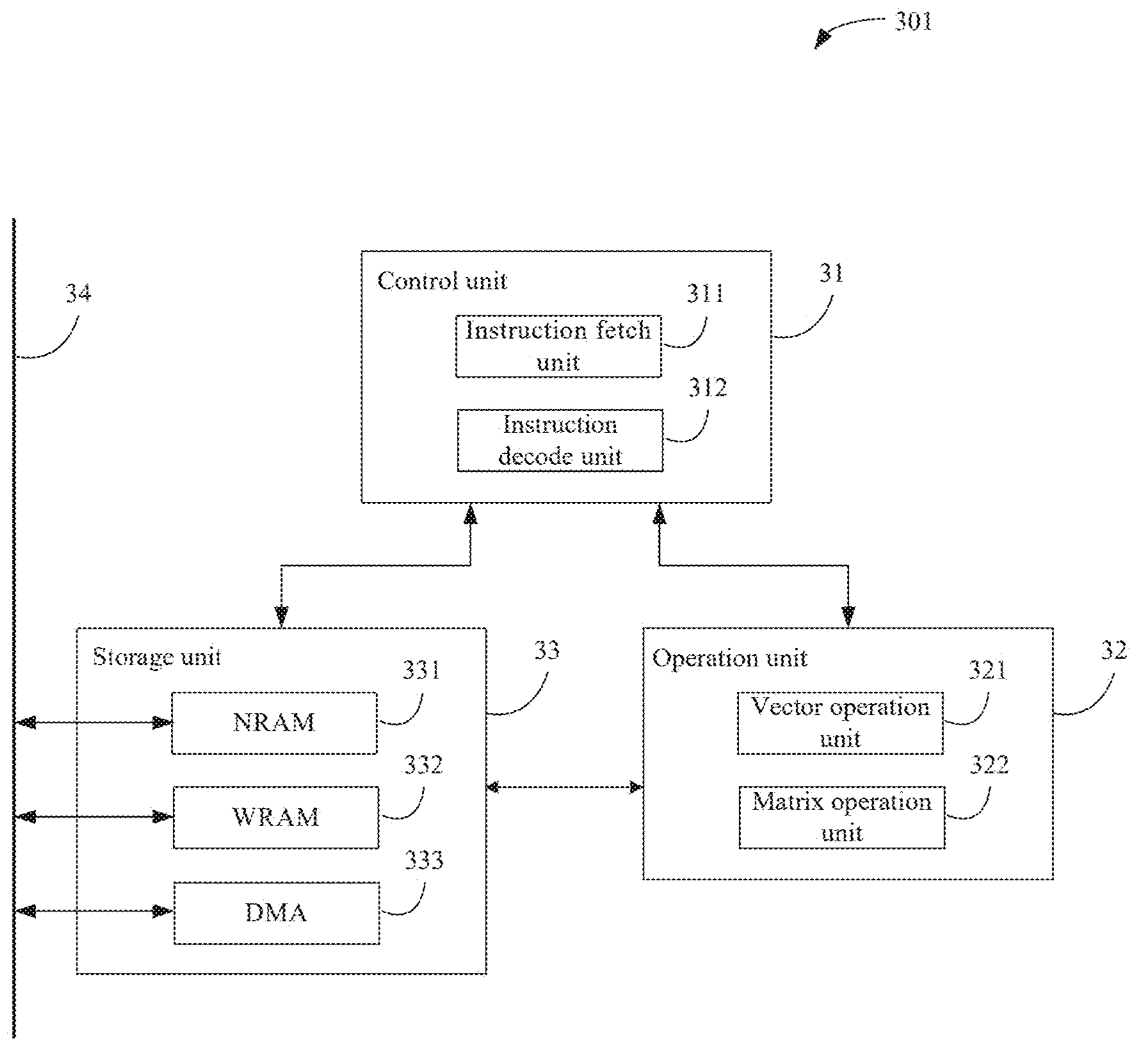
FIG. 3 is a schematic diagram of an internal structure of a single-core computing apparatus according to an embodiment of the present disclosure.

FIG. 3 is a schematic diagram of an internal structure of computing apparatus 201 with a single core. A single-core computing apparatus 301 is configured to process input data in computer vision, speech, natural language, and data mining. The single-core computing apparatus 301 includes three units: a control unit 31, an operation unit 32, and a storage unit 33.

The control unit 31 is used for coordinating and controlling work of the operation unit 32 and the storage unit 33 to complete a deep learning task. The control unit 31 includes an instruction fetch unit (IFU) 311 and an instruction decode unit (IDU) 312. The instruction fetch unit 311 is used to acquire an instruction from the processing apparatus 203. The instruction decode unit 312 is used to decode the instruction acquired and send a decoding result as control information to the operation unit 32 and the storage unit 33.

The operation unit 32 includes a vector operation unit 321 and a matrix operation unit 322. The vector operation unit 321 is used to perform a vector operation and supports complex operations such as vector multiplications, additions, and nonlinear conversions. The matrix operation unit 322 is responsible for core computing of deep learning algorithm, which includes matrix multiplication and convolution.

Storage unit 33 is used to store or move related data. The storage unit 33 includes a neuron storage unit (neuron random access memory (RAM), NRAM) 331, a parameter storage unit (weight RAM, WRAM) 332, and a direct memory access unit (direct memory access, DMA) 333. The NRAM 331 is used to store input neurons, output neurons, and an intermediate result after computing. The WRAM 332 is used to store a convolution kernel of a deep learning network, which is a weight. The DMA 333 is connected to the DRAM 204 through a bus 34 and is responsible for data moving between the single-core computing apparatus 301 and the DRAM 204.

Figure 4:
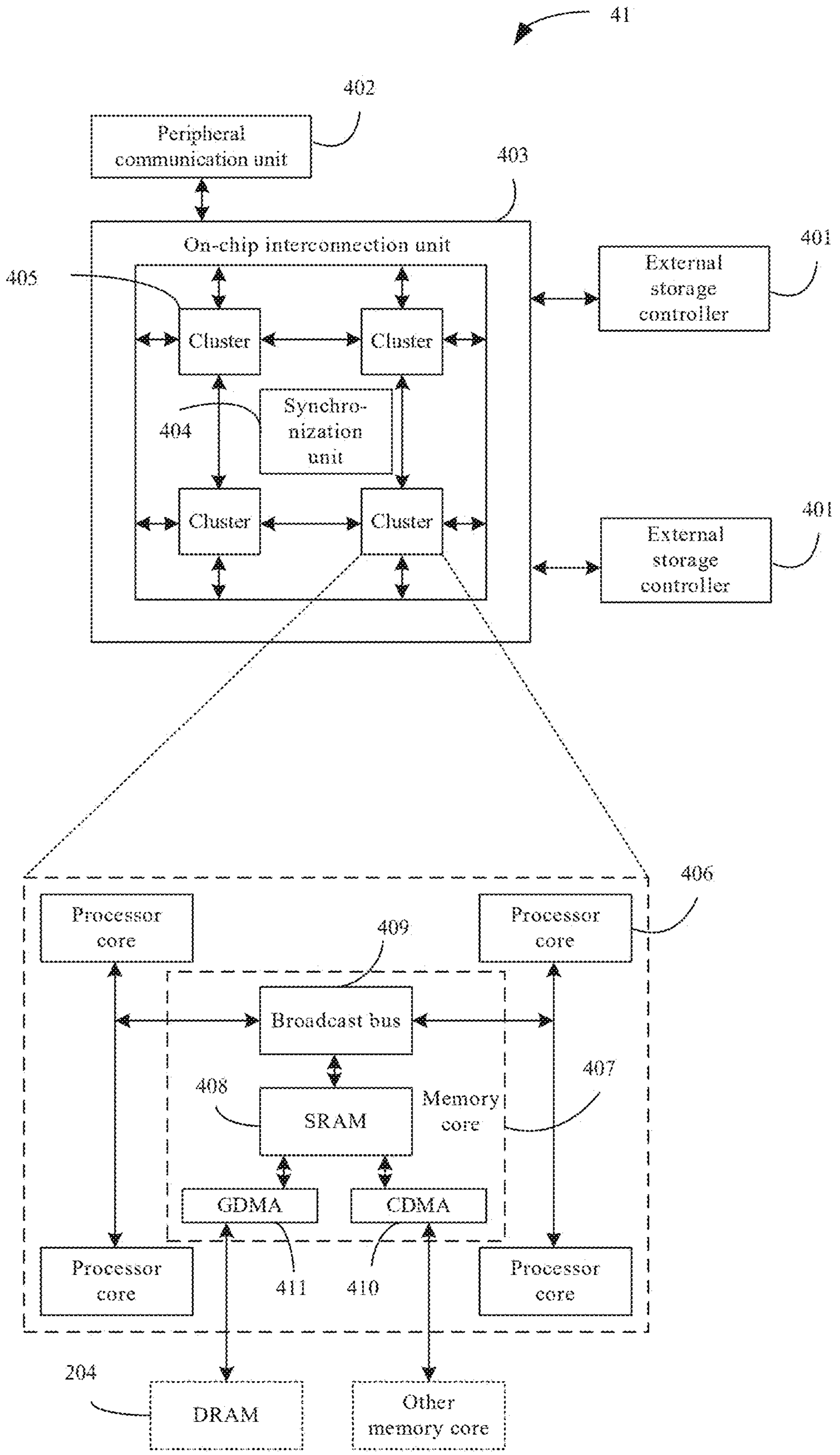
FIG. 4 is a schematic diagram of an internal structure of a multi-core computing apparatus according to an embodiment of the present disclosure.

FIG. 4 is a schematic diagram of an internal structure of computing apparatus 201 with multiple cores. A multi-core computing apparatus 41 adopts a hierarchical structure design. The multi-core computing apparatus 41 serves as an on-chip system and includes at least one cluster. Each cluster further includes a plurality of processor cores. In other words, the multi-core computing apparatus 41 is composed by a hierarchy of on-chip system-cluster-processor core.

In terms of a hierarchy of the on-chip system, as shown in FIG. 4, the multi-core computing apparatus 41 includes an external storage controller 401, a peripheral communication unit 402, an on-chip interconnection unit 403, a synchronization unit 404, and a plurality of clusters 405.

There may be a plurality of external storage controllers 401, two of which are exemplified in the figure. The external storage controller is used to, in response to access requests from the processor cores, access an external storage device, such as the DRAM 204 in FIG. 2, to read or write data from off-chip. The peripheral communication unit 402 is used to receive a control signal from the processing apparatus 203 through the interface apparatus 202 and start the computing apparatus 201 to perform a task. The on-chip interconnection unit 403 connects the external storage controller 401, the peripheral communication unit 402, and the plurality of clusters 405 and is used to transfer data and control signals among the units. The synchronization unit 404 is a global barrier controller (GBC) and is used to coordinate a work progress of each cluster to ensure synchronization of information. The plurality of clusters 405 are computing cores of the multi-core computing apparatus 41, four of which are exemplified in the figure. With the development of hardware, the multi-core computing apparatus 41 of the present disclosure may further include 8, 16, 64, or even more clusters 405. Clusters 405 are used for efficiently performing deep learning algorithms.

In terms of a hierarchy of the cluster, as shown in FIG. 4, each cluster 405 includes a plurality of processor cores (IPU cores) 406 and a memory core (MEM core) 407.

Figure 5:
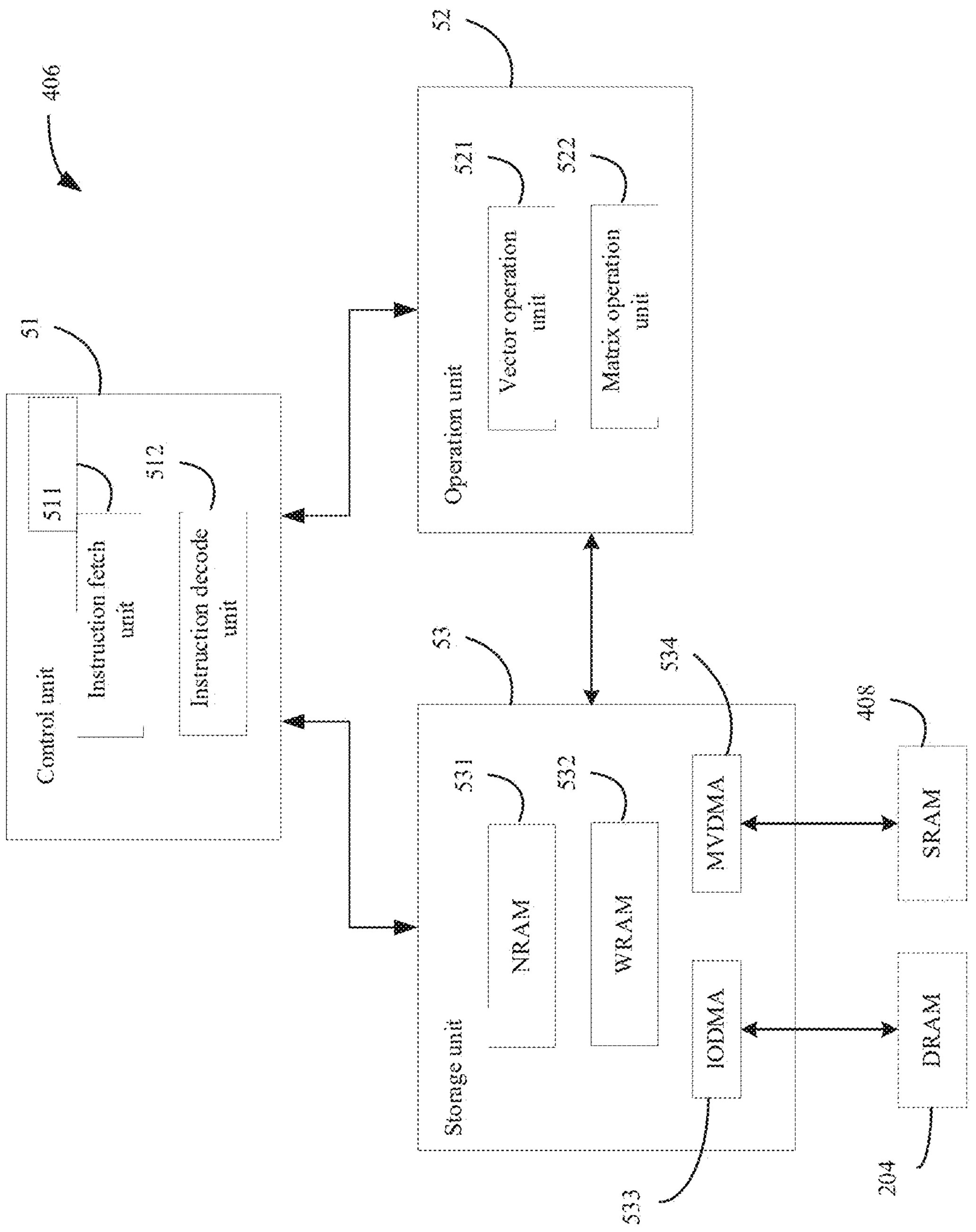
FIG. 5 is a schematic diagram of an internal structure of a processor core according to an embodiment of the present disclosure.

Four processor cores 406 are exemplified in the figure. The present disclosure does not limit a count of the processor cores 406. An internal architecture of the processor core 406 is shown in FIG. 5. Each processor core 406 is similar to the single-core computing apparatus 301 in FIG. 3. The processor core 406 similarly includes three units: a control unit 51, an operation unit 52, and a storage unit 53. Functions and structures of the control unit 51, the operation unit 52, and the storage unit 53 are roughly the same as those of the control unit 31, the operation unit 32, and the storage unit 33, which will not be repeated herein. It is required to be especially noted that the storage unit 53 includes an input/output direct memory access (IODMA) unit 533 and a move direct memory access (MVDMA) unit 534. The IODMA 533 controls memory access of an NRAM 531/a WRAM 532 and the DRAM 204 through a broadcast bus 409. The MVDMA 534 is configured to control memory access of the NRAM 531/the WRAM 532 and a storage unit (SRAM) 408.

Going back to FIG. 4, the memory core 407 is mainly used for storage and communication. In other words, the memory core 407 is mainly used for storing shared data or intermediate results between the processor cores 406 and performing communications between the clusters 405 and the DRAM 204, communications between the clusters 405, and communications between the processor cores 406. In other embodiments, the memory core 407 is capable of performing a scalar operation and is used for performing the scalar operation.

The memory core 407 includes the SRAM 408, the broadcast bus 409, a cluster direct memory access unit (cluster direct memory access, CDMA) 410, and a global direct memory access unit (global direct memory access, GDMA) 411. The SRAM 408 plays the role of a high-performance data transfer station. Data reused among different processor cores 406 in a same cluster 405 is not required to be acquired from the DRAM 204 by the processor cores 406 separately. Instead, the data is transferred among the processor cores 406 by the SRAM 408. The memory core 407 is only required to quickly distribute the reused data from the SRAM 408 to the plurality of processor cores 406 to improve inter-core communication efficiency and greatly reduce on-chip and off-chip input/output access.

The broadcast bus 409, the CDMA 410, and the GDMA 411 are used for performing communication between the processor cores 406, communication between the clusters 405, and data transfer between the clusters 405 and the DRAM 204, respectively. The above will be explained separately below.

The broadcast bus 409 is used for completing high-speed communication between the processor cores 406 in the clusters 405. The broadcast bus 409 of this embodiment supports inter-core communication modes including unicast, multicast, and broadcast. The unicast refers to point-to-point (such as single processor core-to-single processor core) data transfer. The multicast refers to a communication mode in which a copy of data is transferred from the SRAM 408 to certain processor cores 406. The broadcast refers to a communication mode in which a copy of data is transferred from SRAM 408 to all the processor cores 406. The broadcast is a special case of the multicast.

The CDMA 410 is used for controlling memory access of the SRAM 408 between different clusters 405 in the same computing apparatus 201.

The GDMA 411 works with the external storage controller 401 and is used for controlling memory access from the SRAM 408 to the DRAM 204 in the clusters 405 or reading data from the DRAM 204 to the SRAM 408. It may be known from the above that communication between the DRAM 204 and an NRAM 431 or a WRAM 432 may be implemented through two channels. The first channel is to directly contact the DRAM 204 with the NRAM 431 or the WRAM 432 through an IODAM 433. A second channel is to transfer the data between the DRAM 204 and the SRAM 408 through the GDMA 411 first, and then to transfer the data between the SRAM 408 and the NRAM 431 or the WRAM 432 through the MVDMA 534. Although it seems that the second channel requires more components and has long data flows, in fact, in some embodiments, the bandwidth of the second channel is much greater than that of the first channel. Therefore, the communication between the DRAM 204 and the NRAM 431 or the WRAM 432 may be more efficient through the second channel. The embodiment of the present disclosure may select a data transfer channel according to hardware conditions.

In other embodiments, a function of the GDMA 411 and a function of the IODMA 533 may be integrated in the same component. For the sake of description, the GDMA 411 and the IODMA 533 are viewed as different components in the present disclosure. For those skilled in the art, as long as functions and technical effects realized by components are similar to the present disclosure, the components shall fall within the scope of protection of the present disclosure. Further, the function of the GDMA 411, the function of the IODMA 533, a function of the CDMA 410, and a function of the MVDMA 534 may also be implemented by a same component.

A neural network model is usually composed of an input layer, a convolution layer, an activation function, a pooling layer, and a fully connected layer, with several layers at least and hundreds of layers at most. Each layer performs an operator. For example, the convolution layer performs a convolution operator, and how many operators are required to be performed as how many layers there are.

Neural network model training is to input training samples to adjust parameters of each layer, so that a result computed by the neural network model is as close as possible to a real result. The neural network model training includes forward propagation and back propagation. The forward propagation is to, based on the existing model, input the training samples and gradually extract input feature maps into abstract features through computing of each layer of the neural network model. The back propagation is to, according to a loss function obtained by computing of a forward propagation result and a true value, compute a partial derivative to each parameter by the loss function through a chain rule by adopting a gradient descent method, so as to update parameters. Then, the parameters updated are used for training. This process is repeated many times, so that a computing result of the forward propagation meets expectation finally. Using a trained neural network model to perform a forward operation on an input of a real environment to complete a set task is called an inference of the neural network model.

Based on the above hardware environment, the embodiment of the present disclosure provides a data processing solution for executing the neural network model, More specifically, the embodiment of the present disclosure provides a solution for optimizing the convolution operation in the neural network model.

Figure 6:
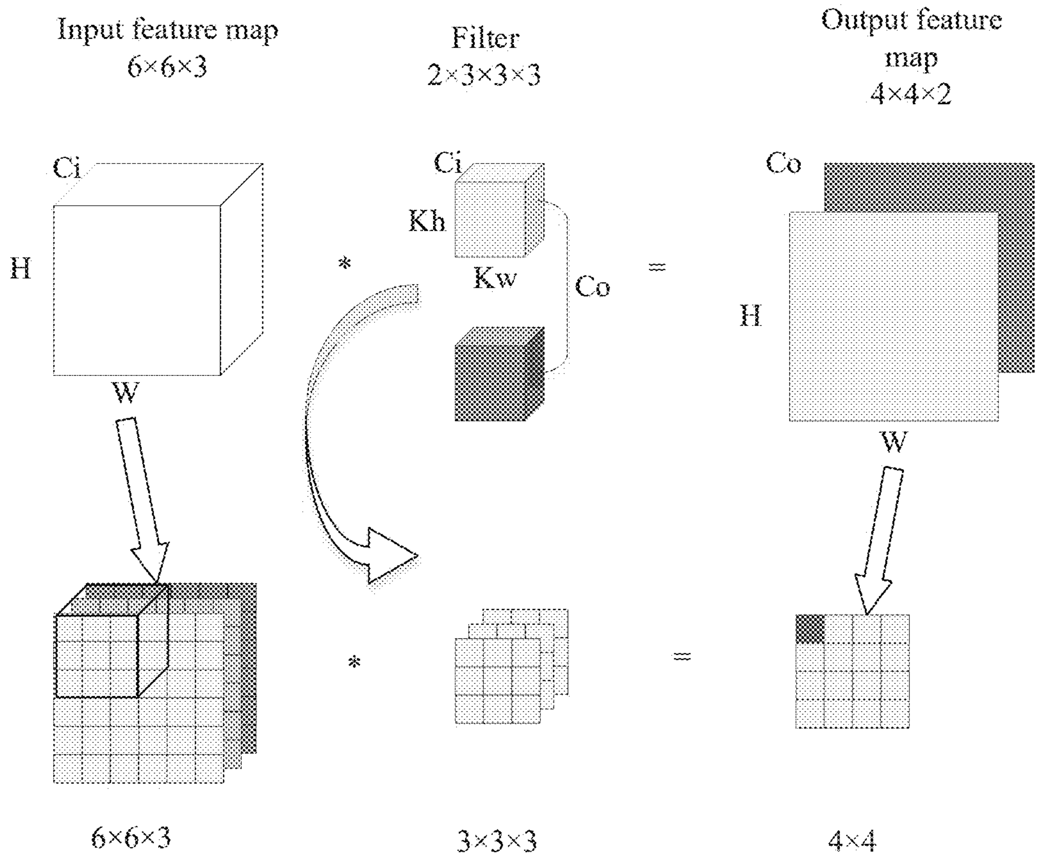
FIG. 6 is an example of an exemplary convolution operation that may be applied to an embodiment of the present disclosure.

FIG. 6 is an example of an exemplary convolution operation that may be applied to an embodiment of the present disclosure. As shown in the figure, in the convolution layer in the neural network model, feature extraction may be performed through performing convolution processing on an input feature map by using a filter.

An input feature map with a size of 6×6×3 is exemplarily shown in the figure, where the input feature map represents three feature maps with a size of 6×6 (a three-dimensional matrix with a size of 6×6×3), which represent three different features. In this embodiment, a width W of the feature map is 6, and a height H of the feature map is also 6. The number of input feature maps may be called an input channel count Ci. For example, there are three input feature maps in the figure, and the three feature maps are also called three feature channels.

The figure exemplarily shows a filter with a size of 2×3×3×3, where the filter represents two convolution kernels with a size of 3×3×3 (two three-dimensional matrices with a size of 3×3×3). Each convolution kernel has three different convolution kernels with a size of 3×3, and the three different convolution kernels correspond to three input different feature maps. A count of three-dimensional convolution kernels may be called an output channel count Co. In this embodiment, the count of the three-dimensional convolution kernels is 2. In each three-dimensional convolution kernel, a count of two-dimensional convolution kernels may be called an input channel count Ci, which is the same as a count of channels of the input feature map. Each two-dimensional convolution kernel has a corresponding width Kw and a corresponding height Kh. In this embodiment, Kw and Kh are both 3.

The convolution result of the input feature map and the filter is to output two feature maps with a size of 4×4. The convolution result of the input feature map and the above three-dimensional convolution kernel is to obtain the above one output feature map with a size of 4×4. The convolution result of the input feature map and the below three-dimensional convolution kernel is to obtain the below one output feature map with a size of 4×4. A value at each position in the output feature map is obtained by performing a two-dimensional convolution operation on a corresponding block and a corresponding convolution kernel of each input feature map and then summing the corresponding block and the corresponding convolution kernel of each input feature map. For example, the figure shows that a value at (0, 0) in the above output feature map is obtained by performing a two-dimensional convolution operation on a block framed by a black cube in the input feature map and the above three-dimensional convolution kernel to obtain three values and then summing the three values to obtain a final value. In order to obtain outputs of other positions, a position of the convolution kernel may be moved in the input feature map. In the example of the figure, a convolution stride (Sx, Sy) is (1,1), and a value at (0,1) or (1,0) in the above output feature map may be obtained respectively by performing the convolution operation after moving the convolution kernel one space to the right in the horizontal direction (width direction) or down in the vertical direction (height direction).

It may be known from the above description that, in one convolution layer of the neural network, there is one group of input feature maps, totally including H×W×Ci pieces of information, where H and W are the height and the width of the input feature map respectively, and Ci is the count of input feature maps, which is also called the input channel count. There are Ci×Co convolution kernels with a size of Kh×Kw in the convolution layer, where Ci is the input channel count, Co is the count of output feature maps (or the output channel count), Kh is the height of the convolution kernel, and Kw is the width of the convolution kernel. There are Ho×Wo×Co pieces of information in the output feature map, where Ho is the height of the output feature map, Wo is the width of the output feature map, and Co is the output channel count. Besides, during the convolution operation, the convolution stride (Sx, Sy) is also involved, and a size of the convolution stride may affect a size of the output feature map.

In the embodiment of the present disclosure, dimensions of multi-dimensional data involved are represented as (N, H, W, C) or (Co, H. W. Ci), which represents a storage order of the data in a memory. It may be understood that, although the multi-dimensional data has multiple dimensions, since the layout of the memory is always one-dimensional, there is a correspondence between the multi-dimensional data and the storage order in the memory. The multi-dimensional data is usually allocated in continuous storage space. In other words, the multi-dimensional data may be extended in one dimension and stored in the memory in sequence. For example, in the embodiment of the present disclosure, the multi-dimensional data is stored in sequence according to a method that a low dimension (where Ci is the lowest dimension) takes precedence. Adjacent dimensions refer to adjacent dimensions in dimension information representations of the multi-dimensional data. For example, W and Ci are adjacent, and the adjacent dimensions may also be called continuous dimensions.

In order to accelerate computing of the neural network model, a plurality of operation units are usually adopted to perform parallel operations. For example, the operation unit 32 in FIG. 3 or the operation unit 52 in FIG. 5 may include a plurality of convolution-dedicated computing units (or called convolution units). In each convolution unit, for example, a complete (H, W, Ci) dimension may be computed in each convolution unit. In other words, Co (H, W, Ci) dimensions may be distributed to Co convolution units for parallel computing, thereby improving a computing speed. Usually, the count of convolution units is fixed, and if a size of the Co dimension is small, there may be idle convolution units, and computing resources may not be fully utilized. In some circumstances, the size of the Co dimension may be required to be aligned to the count of convolution units for unified scheduling. However, when the size of the Co dimension is small, such alignment limitation may introduce invalid computing, resulting in a lot of waste of resources.

On the other hand, in order to improve memory access speed and fully utilize a memory access bandwidth, an artificial intelligence chip instruction set is usually required to perform vectorization alignment. For the design of the artificial intelligence chip, the Ci dimension is usually used as the lowest dimension; in other words, the above NHWC dimension order is usually used. Therefore, for the alignment requirement of the instruction, a size of the Ci dimension is required to be aligned to a specified value. For example, the size of the Ci dimension is required to be aligned to an instruction alignment value Aci, so that data may be accessed by taking the instruction alignment value Aci as a unit. However, when the size of the Ci dimension is small, such alignment limitation may cause a lot of redundancy computing, resulting in waste of resources.

Based on this, based on the above hardware environment, the embodiment of the present disclosure provides a data processing solution used for executing the neural network model. A first aspect of the embodiment of the present disclosure provides a first dimension folding solution, which optimizes the Co dimension in the convolution layer and reduces the waste of resources while satisfying the above hardware alignment limitation. A second aspect of the embodiment of the present disclosure provides a second dimension folding solution, which optimizes the Ci dimension in the convolution layer and reduces the waste of resources while satisfying the above instruction alignment limitation. The above two aspects may be implemented separately or implemented in combination. In combination implementation, the two aspects may be complementary, thereby maximizing the optimization of computing performance. The following describes the two aspects separately.

Figure 7:
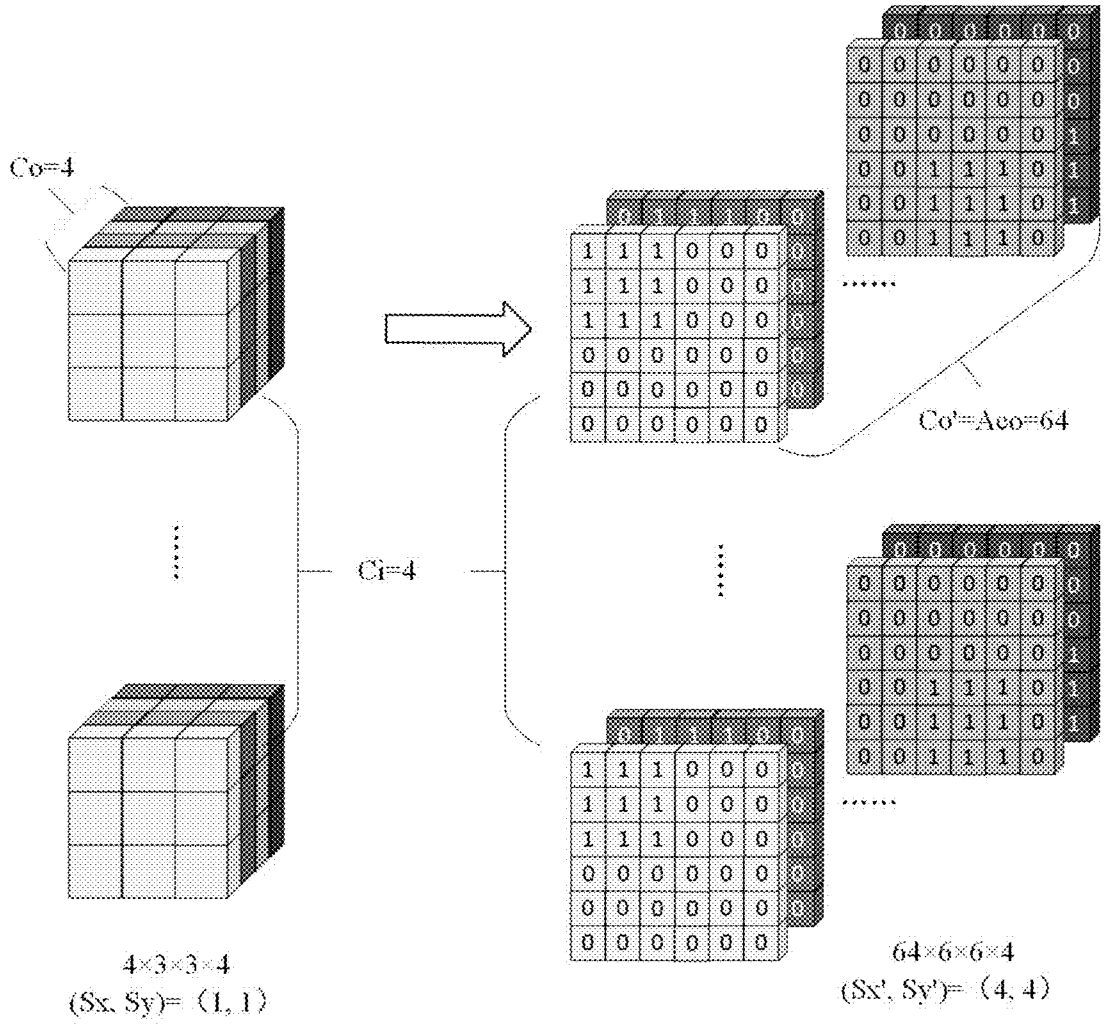
FIG. 7 is an exemplary schematic diagram of first dimension folding according to an embodiment of the present disclosure.

FIG. 7 is an exemplary schematic diagram of the first dimension folding solution according to an embodiment of the present disclosure through a specific example. It is assumed that a count of convolution units used to perform a convolution operation is Aco. Based on different hardware designs, the Aco may have different values, such as 32, 64, 128, and the like. In the following example, Aco-64 is used as an example for description. According to hardware alignment requirements, the Co dimension of the filter is required to be aligned to the Aco; in other words, the Co dimension of the filter is required to be aligned to 64.

The left side of the figure shows an original filter of the convolution layer, which, for example, is represented as 4×3×3×4; in other words, an output channel count Co of the original filter is 4, an input channel count Ci of the original filter is 4, and a size of each convolution kernel of the original filter is 3×3. Besides, a convolution stride of the original filter is (Sx, Sy)=(1, 1). It may be seen from the figure that the Co dimension of the original filter is much smaller than the hardware alignment requirement (64). In the usual way, a zero is filled to the Co dimension to make the Co dimension be aligned to 64. For aligning the Co dimension from 4 to 64, a lot of redundant computing may be increased, leading to a waste of resources.

The right side of the figure shows a first folding filter folded according to an embodiment of the present disclosure, which, for example, is represented as 64×6×6×4; in other words, an output channel count Co' of the first folding filter is 64, an input channel count of the first folding filter is the same as that of the original filter, which is 4, and a size of each convolution kernel of the first folding filter is 6×6. Besides, a convolution stride of the first folding filter becomes (Sx', Sy')=(4, 4). It may be seen that the output channel count of the first folding filter has been aligned to the hardware alignment requirement (64). Therefore, at this time, the convolution units may be fully utilized to perform operation processing.

In the above first dimension folding processing, the first folding filter is synthesized by a plurality of extended filters obtained by moving the original filter by the convolution stride for many times. The first dimension folding processing is based on the following considerations: if the computing is performed based on an original method, single computing may waste some convolution units. Therefore, next computing, and computing after the next computing, and the like, may be moved to the single computing, thereby fully utilizing the convolution units. From a different perspective, the first dimension folding solution of the embodiment of the present disclosure is equivalent to folding computing corresponding to multiple times of moving the convolution stride (or computing in multiple periods of time) into once of moving the convolution stride (or computing in one period of time).

During two-dimensional convolution, the convolution stride includes a horizontal convolution stride Sx along a width direction of the convolution kernel and a vertical convolution stride Sy along a height direction of the convolution kernel. By moving the convolution stride at any one direction once, one computing may be obtained, which corresponds to one filter. This filter is obtained by moving the convolution stride of the original filter once. In order to be synthesized with other filters generated in a similar manner later, the width and height of the convolution kernel of the filter are required to be extended accordingly according to the convolution stride, so this filter is called the extended filter.

Assuming that the original filter moves the horizontal convolution stride for Nw1−1 times in the convolution kernel width direction and moves the vertical convolution stride for Nh1−1 times in the convolution kernel height direction, $N_{total1}$ extended filters may be obtained, where $N_{total1}$=Nw1×Nh1, Nw1 and Nh1are natural numbers. These $N_{total1}$ extended filters may be synthesized into one folding filter on the output channel Co dimension, which is called the first folding filter.

Still taking the example in FIG. 7 as an example, the Co of the original filter is 4. According to the hardware alignment requirement, the Co of the original filter is required to be aligned to 64. Therefore, 64÷4=16 extended filters are required to be synthesized into one first folding filter.

Figure 8:
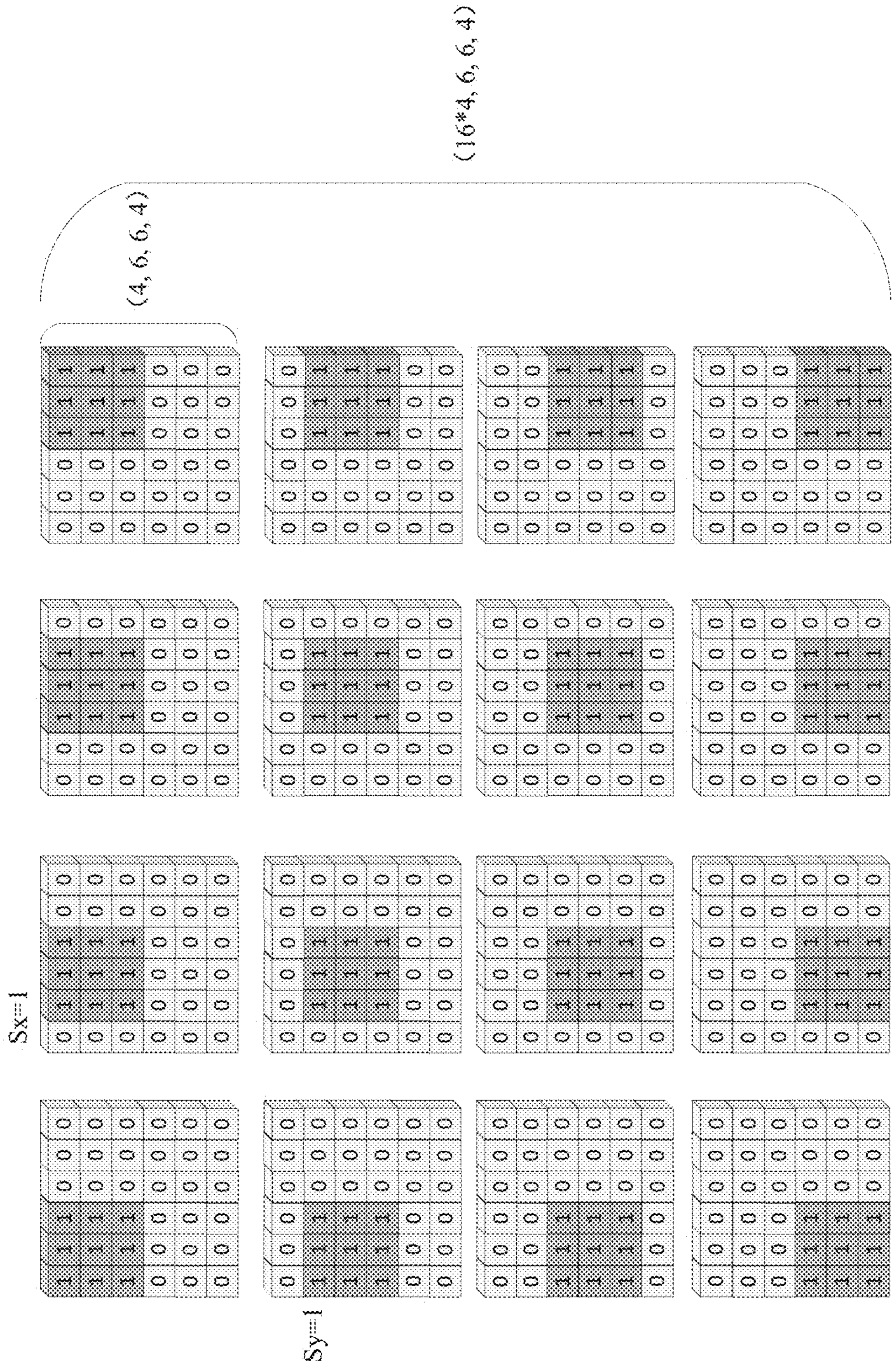
FIG. 8 is a more detailed first dimension folding diagram according to an embodiment of the present disclosure.

FIG. 8 shows a more detailed first dimension folding diagram according to an embodiment of the present disclosure. In the figure, 16 extended filters required in the above example are shown. Dark parts in the figure show convolution kernels of the original filter. It may be seen from the figure that these 16 extended filters are obtained by moving Sx thrice in the width direction and moving Sy thrice in the height direction. In other words, the original filter is quadrupled along both the width direction and the height direction, thereby totally obtaining 16 extended filters.

To synthesize these 16 extended filters into one first folding filter in the output channel Co dimension, shapes of these 16 extended filters are required to be adjusted. As shown in the figure, a zero may be filled to areas except the dark parts occupied by the original filter, thereby making the widths and heights of the 16 extended filters be consistent. The value of each extended filter (6×6 convolution kernel) for convolution computing is the same as that of the original filter (3×3 convolution kernel) for convolution computing.

Then, the 16 (4, 6, 6, 4) extended filters may be folded into one (16*4, 6, 6, 4) first folding filter in the output channel Co dimension. At this time, the output channel Co' of the first folding filter is 16*4=64. In other words, the output channel Co' of the first folding filter equals the count of convolution units, which meets the hardware alignment requirements and achieves the purpose of fully utilizing the convolution units.

It may be seen from the folding process in FIG. 8 that the output channel count of the first folding filter is increased multiple times compared with the output channel count of the original filter. Therefore, the folding solution of the embodiment of the present disclosure is especially suitable for a case where the output channel count Co of the original filter is relatively small. For example, the Co is not greater than a first threshold A1, and the first threshold A1 is smaller than a second threshold Aco (which is the hardware alignment requirement). In some embodiments, the first threshold A1≤Aco/2. A practical result shows that the smaller the Co, the bigger the improvement room compared with existing algorithms.

It may be seen from the folding process of FIG. 8 that, based on each parameter of the original filter and the hardware alignment requirement, each parameter of the first folding filter may be determined.

First, a first overall folding multiple$N_{total1}$ may be determined based on the output channel count Co of the original filter and the hardware alignment requirement Aco.

In some embodiments, an overall folding multiple N may be determined according to followings:

$$N_{total1} = Aco/Coa. \tag{1-1}$$

Coa is a value that the Co is aligned to the nearest value of Aco/$2^n$, and n is a natural number.

As described above, in the embodiment of the present disclosure, the Co is aligned to a specified valueAcoby multiple foldings. When Aco is $2^n$ times of the Co, by a direct division, the overall folding multiple may be obtained. For example, in the above example, Co=4, so $N_{total1}$=64/4=16 multiples. When Aco is not $2^n$ times of the Co, the Co is required to be aligned to the nearest value of Aco/$2^n$. For example, ifAcois 64, Aco/$2^n$ includes 32, 16, 8, 4, and 2, and the Co is required to be aligned to the nearest value among these numbers. For example, if Co=3, the Co is required to be aligned to 4; and if Co=5, the Co is required to be aligned to 8, and so on. After aligning, the Co is divided by Aco, and then the first overall folding multiple $N_{total1}$ is obtained.

Then, after the first overall folding multiple $N_{total1}$ is determined, it may be split to a first width dimension folding multiple Nw1 in the convolution kernel width direction and a first height dimension folding multiple Nh1 in the convolution kernel height direction. The first overall folding multiple may be split according to different rules to realize different advantages.

In one embodiment, the folding multiple may be split preferentially in the convolution kernel width direction. As described below, what is obtained by using the filter obtained after the first dimension folding to perform the convolution operation is an intermediate result, and the intermediate result is required to perform dimensional reverse folding or dimensional rearrangement to obtain a final result. When the first dimension folding happens in the convolution kernel width direction, the dimensional rearrangement is easy. Only a dimension representation of the intermediate result is required to be adjusted, which is also called dimensional recombination, and no other processing is required. Therefore, by preferentially splitting the folding multiple in the convolution kernel width direction, following processing may be simplified. For example, in the above example, the first overall folding multiple 16 may be split into 16 multiples in the width and 1 multiple in the height, therefore simplifying following processing of results. At this time, a size of the convolution kernel of the first folding filter is 3×18. In another implementation, the first overall folding multiple 16 in the above example is split into 8 multiples in the width and 2 multiples in the height. At this time, the size of the convolution kernel of the first folding filter is 4×10. It may be seen that different splitting methods may affect the size of the convolution kernel of the first folding filter.

In another embodiment, the folding multiple may be split preferentially along a direction with a small convolution stride. It may be seen from the above folding process that the size of the convolution kernel of the first folding filter is relevant to the convolution stride of the original filter. The larger the size of the convolution stride, the larger the convolution kernel of the first folding filter expands. Therefore, preferentially splitting the folding multiple in the direction with the small convolution stride is beneficial to reduce the expansion of the convolution kernel and thus reduce the amount of operation. For example, assuming that the convolution kernel of the original filter is 3×3, and (Sx, Sy)=(1, 3), the first overall folding multiple 16 may be split into 16 multiples in the width and 1 multiple in the height, so the size of the convolution kernel of the first folding filter is 3×18. If the first overall folding multiple 16 is split into 8 multiples in the width and 2 multiples in the height, at this time, the size of the convolution kernel of the first folding filter is 6×10. If the first overall folding multiple 16 is split into 4 multiples in the width and 4 multiples in the height, the size of the convolution kernel of the first folding filter is 12×6.

In another embodiment, the folding multiple may be split averagely in the convolution kernel width direction and the convolution kernel height direction. For example, referring to examples in FIG. 7 and FIG. 8, the first overall folding multiple 16 is split into 4 multiples in the width and 4 multiples in the height averagely.

In another embodiment, the folding multiple may be split to minimize the size of the convolution kernel of the first folding filter, thereby minimizing increased redundant operations.

Based on various rules above, in some embodiments, the first overall folding multiple $N_{total1}$ may be split according to followings:

$$Nw1 = \begin{cases} \sqrt{N_{total1}} & \text{if } \sqrt{N_{total1}} \text{ is an integer} \\ \sqrt{\frac{N_{total1}}{2}} * 2 & \text{if } \sqrt{N_{total1}} \text{ is not an integer} \end{cases}. \tag{1-2}$$

$$Nh1 = N_{total1}/Nw1. \tag{1-3}$$

After a first width dimension folding multiple Nw1 in the convolution kernel width direction and a first height dimension folding multiple Nh1 in the convolution kernel height direction are determined, the convolution stride of the first folding filter may be determined based on Nw1, Nh1, and the convolution stride of the original filter; and the size of the convolution kernel of the first folding filter may be determined based on Nw1, Nh1, and the convolution kernel of the original filter, and the convolution stride of the original filter.

In some embodiments, the convolution stride of the folding filter may be determined according to followings:

$$S'_x = S_x * Nw1. \tag{1-4}$$

$$S'_y = S_y * Nh1. \tag{1-5}$$

$S_x$ is a horizontal convolution stride of the original filter, $S_y$ is a vertical convolution stride of the original filter, S' is a horizontal convolution stride of the first folding filter, and $S_y'$ is a vertical convolution stride of the first folding filter.

In some embodiments, the size of the convolution kernel of the first folding filter may be determined according to followings:

$$k'_w = k_w + (Nw1 - 1) * S_x. \tag{1-6}$$

$$k'_h = k_h + (Nh1 - 1) * S_y. \tag{1-7}$$

$k_w$ is the convolution kernel width of the original filter, $k_h$ is the convolution kernel height of the original filter, $k_w'$ is the convolution kernel width of the first folding filter, and $k_h'$ is the convolution kernel height of the first folding filter.

Therefore, the above describes how to design each parameter of the first folding filter according to the hardware alignment requirement.

Figure 9:
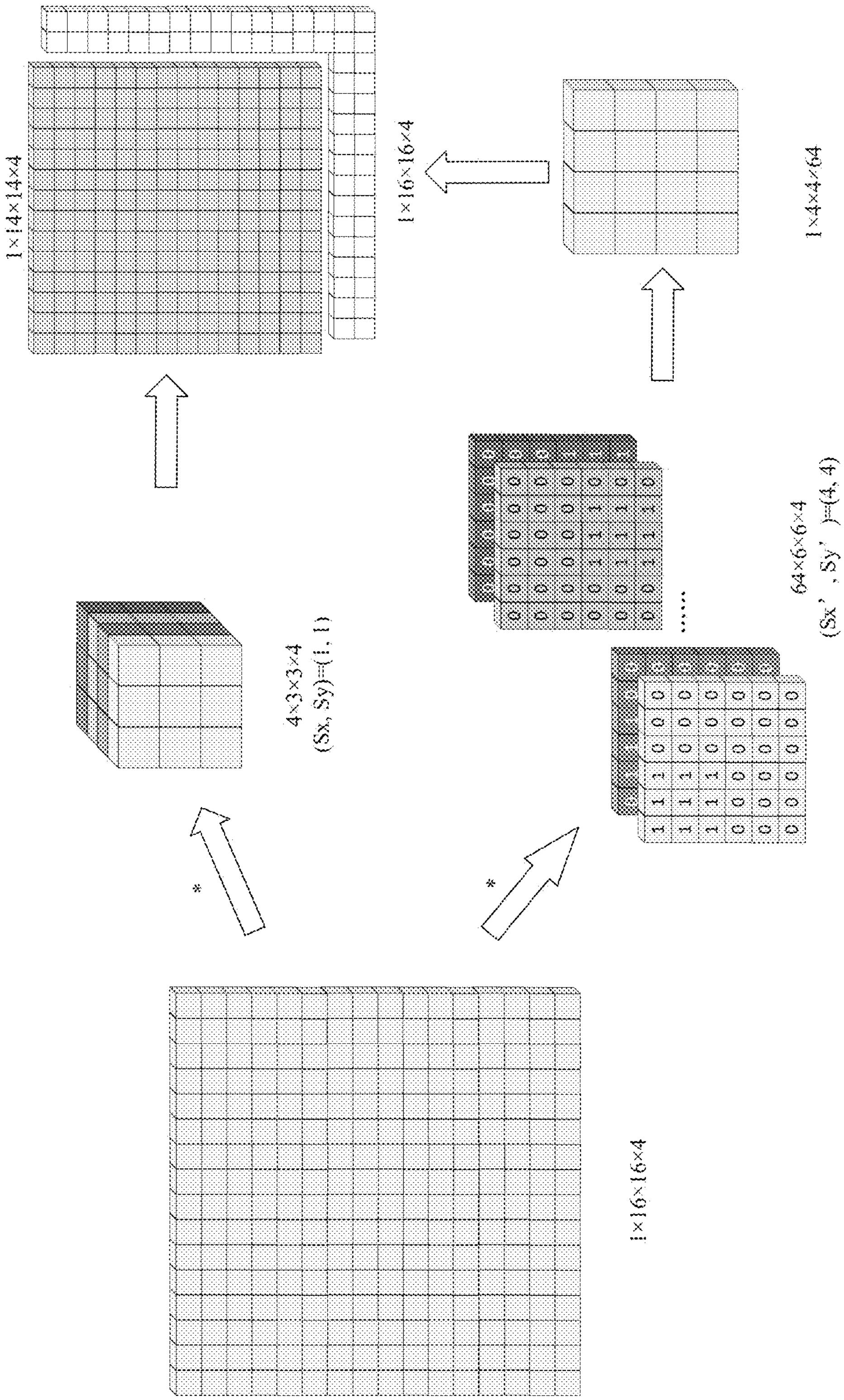
FIG. 9 is an exemplary comparison diagram of computing processes before and after first dimension folding according to an embodiment of the present disclosure.

FIG. 9 is an exemplary comparison diagram of computing processes before and after first dimension folding according to an embodiment of the present disclosure.

It may be seen from the above first dimension folding process that the input channel dimension of the first folding filter is consistent with that of the original filter. Therefore, the input feature map may be convolved directly with the first folding filter without any processing.

As shown in the figure, it is assumed that the input feature map is (1, 16, 16, 4); in other words, there are four 16×16 feature maps. The upper part of the figure shows a result obtained by using an original filter (4, 3, 3, 4) and a convolution stride (Sx, $S_y$)=(1, 1) to perform a convolution operation. The output feature map is (1, 14, 14, 4), which includes 4 feature maps with a size of 14×14, and these feature maps are shown by dark squares in the figure. Those skilled in the art may understand that, for the sake of clarity, data on the Ci dimension is not drawn but is only represented by values.

Comparatively, the bottom of the figure shows a result obtained by using a first folding filter (64, 6, 6, 4) and a convolution stride (Sx',Sy')=(4, 4) to perform the convolution operation. The output feature map is (1, 4, 4, 64), which includes 64 feature maps with a size of 4×4.

It may be seen from the comparison in the figure that, although a value of each extended filter (6×6 convolution kernel) for performing the convolution operation is the same as that of the original filter (3×3 convolution kernel) for performing the convolution operation, since multiple operations on the convolution stride are put into one operation, positions of data values will change, or the data values will be rearranged in the dimension. The intermediate result obtained by the convolution operation of the first folding filter on the input feature map is rearranged in the dimension again, which is called the dimensional reverse folding, to obtain the final output feature map, thereby being consistent with the operation result of the original filter. The dimension of the intermediate result may be represented as (N, ceil (Ho/Nh1), ceil(Wo/Nw1), Nh1*Nw1*Coa), where ceil ( ) represents a rounding up function, and Coa is a value that Co is aligned to the nearest value of $Aco/2^n$. For example, for the example shown in the figure, Coa-Co=4, Nh1=Nw1=4, ceil(Ho/Nh1)=ceil(14/4)=4, and ceil(Wo/Nw1)=ceil(14/4)=4. Due to convolution kernel expansion and convolution step increase caused by the first dimension folding of the filter, and depending on the size of the input feature map, there may be some redundancy in the folded convolution operation. When intermediate results are dimensionally rearranged, redundant computing may occur at the outermost side of a truly required result, specifically including the rightmost side of the result and the lowermost side of the result. For example, in the example of the figure, after dimensional rearrangement, the intermediate result (1, 4, 4, 64) may become (1, 16, 16, 4). Compared with the original result (1, 14, 14, 4), there are some redundant areas, as shown by white square areas with an inverted "L" shape in the figure. At this time, these redundant areas are required to be removed.

It may be known from the above description that the first dimension folding may be distributed in the width direction and/or the height direction of the convolution kernel. Folding in different directions leads to different dimensional rearrangement results, so different processing methods are required. In the description below, for the sake of simplicity, the above redundant areas are not considered in the representation. However, according to the description in the present disclosure, those skilled in the art may understand that, in the case of redundant areas, similarly, the description below may be referred for dimensional rearrangement, and then redundancy removal is performed.

In an embodiment, when only the folding in the convolution kernel width W direction is performed in the first dimension folding, which means that the extended filters only include extended filters obtained by moving the original filter in the convolution kernel width W direction, the output feature map may be obtained by dimensional recombination of the intermediate results directly.

As mentioned earlier in the embodiment of the present disclosure, the dimensional representation of the multi-dimensional data involved is (Co, H, W, Ci); in other words, the storage sequence of the data in the memory is Co, H, W, Ci, which means that Ci dimension is the lowest dimension. Those skilled in the art may also understand that splitting or merging adjacent dimensions in the multi-dimensional data does not affect a position of each data element of the multi-dimensional data in the memory.

In the embodiment of the present disclosure, based on properties of the convolution operation, W dimension and Ci dimension are adjacent or consecutive. Therefore, if the folding is only performed in the W direction, at this time, the intermediate result (N, Ho, Wo/Nw, Nw*Co) may be directly viewed as (N, Ho, Wo, Co). In other words, the W and Ci dimensions may be recombined from (Wo/Nw, Nw*Co) to (Wo, Co). Such recombination does not affect a storage position of each data element of the intermediate result in the memory.

In another embodiment, when only the folding in the convolution kernel height H direction is performed in the first dimension folding, which means that the extended filters only include extended filters obtained by moving the original filter in the convolution kernel height H direction, the intermediate results are required to be dimensionally transposed to obtain the output feature map. The dimensional transposition may change the position of each data element of the multi-dimensional data in the memory.

Specifically, for the Co dimension of the intermediate result (N, Ho/Nh, Wo, Nh*Co), features of (Co, (Nh−1)*Co] may be transposed back to the H dimension, thereby obtaining (N, Ho, Wo, Co).

Figure 10:
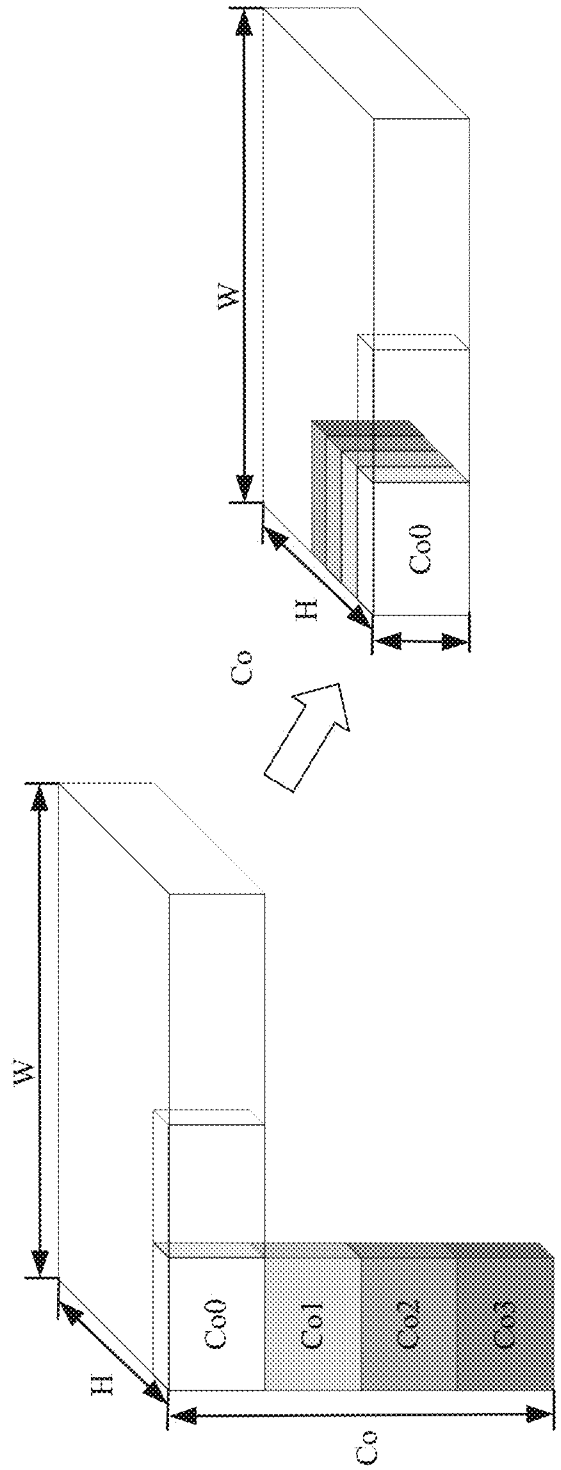
FIG. 10 is an exemplary dimensional transposition diagram according to an embodiment of the present disclosure.

FIG. 10 is an exemplary dimensional transposition diagram according to an embodiment of the present disclosure.

As shown in FIG. 10, assuming that Nh1=4, which means that intermediate results on the left include four times of features in the H direction in the Co dimension, which are Co0, Co1, Co2, and Co3, respectively. At this time, features of the Co0 may be retained in the Co dimension, and features of the Co1, Co2, and Co3 are transferred to the H dimension through dimensional transposition, as shown by a final result shown in the right.

In another embodiment, when the foldings in the convolution kernel width W direction and the convolution kernel height H direction are performed at the same time in the first dimension folding, which means that the extended filters not only include the extended filters obtained by moving the original filter in the convolution kernel width direction, but also include the extended filters obtained by moving the original filter in the convolution kernel height direction, the intermediate results may be processed in combination with the above two embodiments.

In an implementation, the intermediate results may be dimensionally recombined first and then dimensionally transposed to obtain the output feature map. Specifically, the intermediate result (N, Ho/Nh, Wo/Nw, Nh*Nw*Co) may be viewed as (N, Ho/Nh, Wo, Nh*Co) first; in other words, features folded in the W direction in the Co dimension are viewed as features in the W direction. Next, the intermediate results are dimensionally transposed. Specifically, for the Co dimension, features of (Co, (Nh-1)*Co] are transposed to the height H dimension, thereby obtaining (N, Ho, Wo, Co).

In another implementation, the intermediate results may be dimensionally transposed first and then dimensionally recombined to obtain the output feature map.

Specifically, the intermediate result (N, Ho/Nh, Wo/Nw, Nh*Nw*Co) may be dimensionally transposed first. For example, still referring to FIG. 10, Co1, Co2, and Co3 in the Co dimension are transferred to the H dimension through dimensional transposition, but here Co0=Co1=Co2=Co3=Nw*Co. After the dimensional transposition, the intermediate result becomes (N, Ho, Wo/Nw, Nw*Co). Then, each Co0, Co1, Co2, and Co3 are viewed as Nw pieces of Co, thereby obtaining (N, Ho, Wo, Co).

The above describes a scheme of adjusting the filter through the first dimension folding according to embodiments of the present disclosure. In some embodiments, the first folding filter may be generated offline. For example, in the process of inference using the neural network model, the convolution operation may be performed by using the preset, offline-generated first folding filter and the input feature map, so as to perform the inference process. In some embodiments, the first folding filter may be generated online. For example, in the process of training the neural network model, the filter in the convolution layer may be folded online, and then performs the convolution operation with training data to perform the training process.

No matter in which process the first folding filter of the embodiment of the present disclosure is used, Co dimension alignment by the first dimension folding may greatly optimize the computing amount of the convolution operation. In terms of the convolution computing amount, the first dimension folding scheme of the embodiment of the present disclosure and performance of existing convolution operations are compared in the following.

P represents the convolution computing amount, $A_{ci}$ represents a value of Ci after alignment, $A_{co}$ represents a value of Co after alignment, and then $$P = n * A_{ci} * A_{CO} * H_o * W_o * k_w * k_h. \tag{1-8}$$

The hardware that adopts the placement order of NHWC where the Ci dimension is the lowest dimension, with the requirement of vector instruction alignment, is always required to be aligned to $A_{ci}$, so $A_{ci}$ aims at the requirement of the vector instruction alignment; and artificial intelligence computing acceleration hardware usually has a plurality of parallel high-performance convolution computing units, so $A_{co}$ aims at the alignment requirement of the Co dimension of the convolution kernel, and a value of the Co dimension of the convolution kernel is a count of the parallel high-performance convolution computing units.

Before optimization, the computing amount of the existing convolution operation is:

$$P_{before1} = n * A_{ci} * A_{CO} * H_o * W_o * k_w * k_h. \tag{1-9}$$

After optimization by adopting the first dimension folding scheme of the embodiment of the present disclosure, the computing amount of the convolution operation is:

$$\begin{aligned} P_{after1} = n * A_{ci} * A_{CO} * \left(H_o * \left(H_i/S'_y + 1\right)/\left(H_i/S_y + 1\right)\right) * \\ \left(W_o * \left(W_i/S'_x + 1\right)/\left(W_i/S_x + 1\right)\right) * k'_w * k'_h \approx \\ n * A_{ci} * A_{CO} * H_o * \left(S_y/S'_y\right) * W_o\left(S_x/S'_x\right) * k'_w * k'_h = \\ n * A_{ci} * A_{CO} * \left(H_o/N_h\right) * \left(W_o/N_w\right) * k'_w * k'_h. \end{aligned} \tag{1-10}$$

After the first dimension folding, the optimization rate of the performance is:

$$(P_{before1} - P_{after1})/P_{before1} = 1 - \frac{P_{after1}}{P_{before1}} = 1 - k'_w * k'_h/(N_h * N_w * k_w * k_h)$$

Taking the above examples with reference to FIG. 7 and FIG. 8 as examples, before optimization, $P_{before1}$=1*64*64*ho*wo*3*3 (Sx, Sy=1, 1), and after optimization, $P_{after1}$=1*64*64*(ho/4)*(wo/4)*6*6 (Sx, $S_y$=4, 4)=1*64*64*ho*wo*3*3*(1/4).

The convolution computing amount of the decreased convolution computing units is 75%.

It may be known from the above computing amount that, according to the first folding filter scheme provided by the embodiment of the present disclosure, the computing amount of the convolution units may be saved effectively, thereby improving the computing performance of the convolution operation.

The above first dimension folding scheme may be implemented alone to adjust the output channel dimension of the filter, for example, in a case where the output channel dimension of the filter is relatively small. However, the first dimension folding scheme does not change the input channel dimension of the filter. However, in the second dimension folding scheme of the present disclosure, the input channel dimension of the filter may be adjusted. The second dimension folding scheme may be implemented alone (for example, in a case where the input channel dimension of the filter is relatively small), or may be implemented in combination with the first dimension folding scheme (for example, in a case where both the input channel dimension and the output channel dimension of the filter are relatively small). The following describes the second dimension folding scheme of the embodiment of the present disclosure. Those skilled in the art may understand that the second dimension folding may be performed based on the original filter, or may be performed based on the first folding filter obtained through the first dimension folding by the original filter. Therefore, based on the context, the to-be-folded filter mentioned in the present disclosure may be the original filter or the first folding filter.

Figure 11:
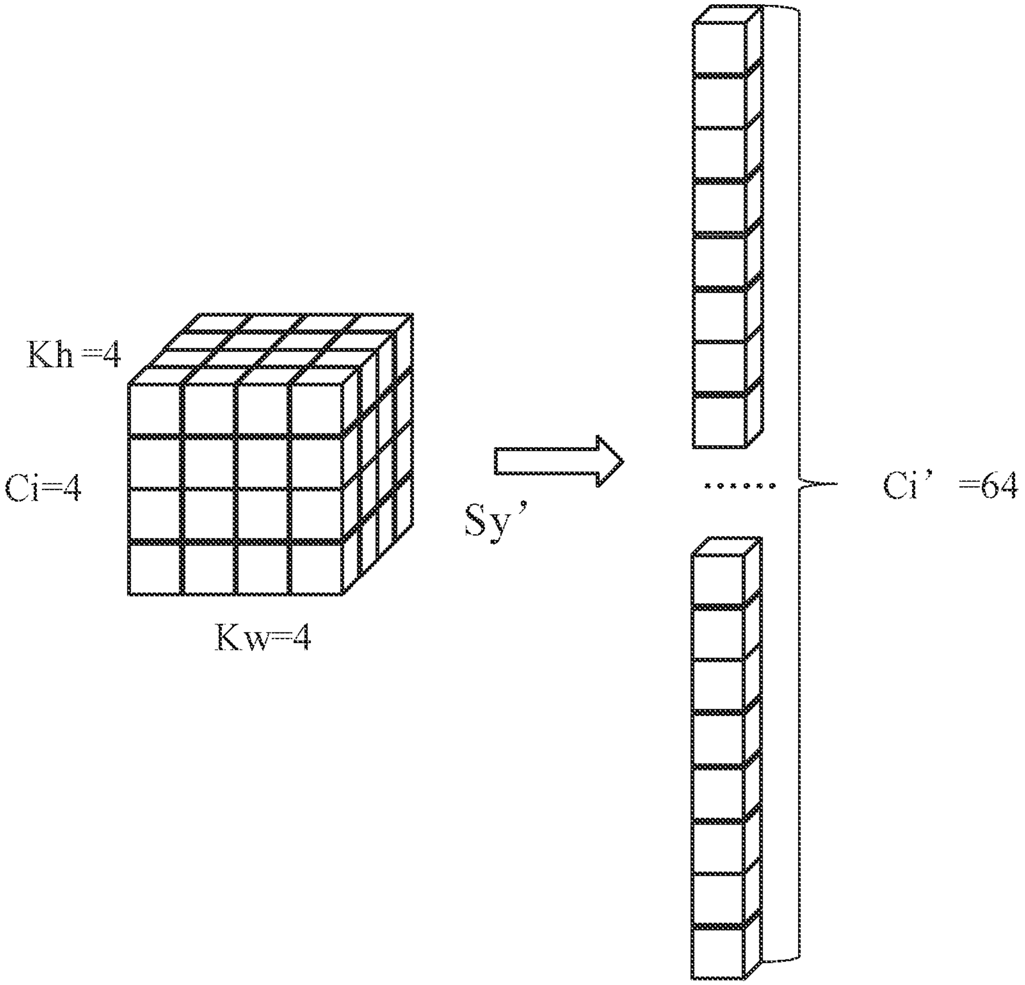
FIG. 11 is an exemplary schematic diagram of second dimension folding according to an embodiment of the present disclosure.

FIG. 11 is an exemplary schematic diagram of a second dimension folding scheme according to an embodiment of the present disclosure through a specific example. It is assumed that an alignment value based on the instruction alignment requirement is Aci. Based on different instruction set designs, the Aci may have different values, such as 32, 64, 128, and the like. In the following example, Aci=64 is used as an example. According to the instruction alignment requirement, the Ci dimension of the filter is required to be aligned to the Aci; in other words, the Ci dimension of the filter is required to be aligned to 64.

The left side of the figure shows the to-be-folded filter in the convolution layer, which, for example, is represented as 64×4×4×4. In other words, the output channel count Co of the to-be-folded filter is 64, the input channel count Ci of the to-be-folded filter is 4, and a size of each convolution kernel is 4×4. It may be seen from the figure that the Ci dimension of the to-be-folded filter is much smaller than the instruction alignment requirement (64). In the usual way, a zero is filled to the Ci dimension to make the Ci dimension be aligned to 64. For aligning the Ci dimension from 4 to 64, a lot of redundant computing may be increased, leading to a waste of resources.

The right side of the figure shows a second folding filter after second dimension folding according to an embodiment of the present disclosure, which, for example, is represented as 64×1×1×64; in other words, an output channel count Co' of the second folding filter is 64, an input channel count of the second folding filter is the same as that of the to-be-folded filter, which is 64, and a size of each convolution kernel is 1×1. It may be seen that since data in the convolution kernel width dimension and height dimension has been transferred to the input channel dimension, the input channel count of the second folding filter has been aligned to the instruction alignment requirement (64). At this time, no additional zero is not required to be filled to realize Ci dimension alignment, thereby avoiding redundant computing brought by filling the zero before.

In the second dimension folding processing described above, the second folding filter is obtained through second dimension folding processing of the to-be-folded filter. The second dimension folding processing is based on following considerations: if the computing is performed based on an original method, realizing the Ci dimension alignment by filling the zero will generate redundant computing and waste computing resources. If data in other dimensions is transferred to the Ci dimension, and the Ci dimension is filled to be aligned to the instruction alignment value, the waste of computing resources may be avoided as much as possible, thereby improving computing efficiency.

Figure 12:
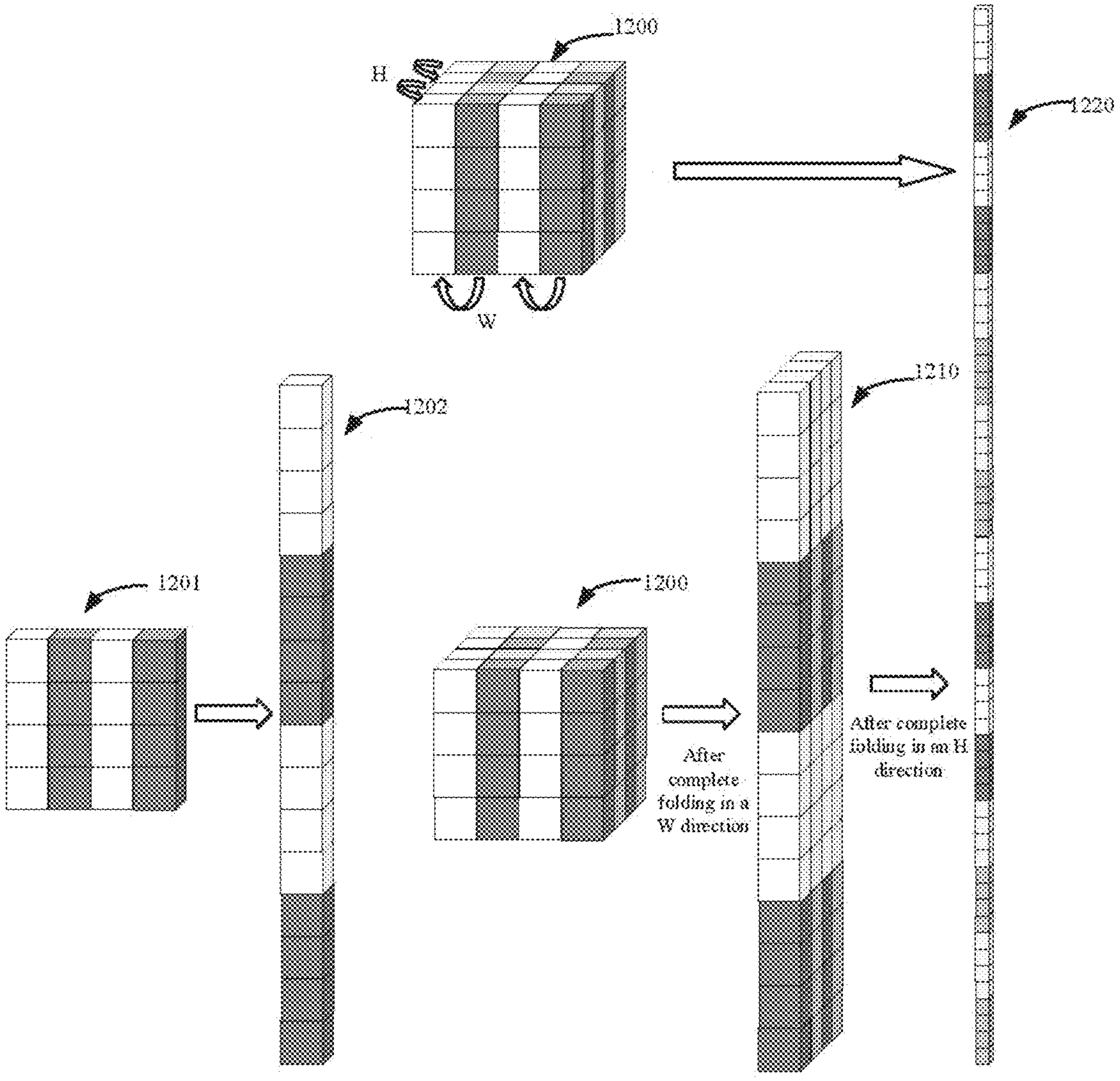
FIG. 12 is a more detailed second dimension folding diagram according to an embodiment of the present disclosure.

FIG. 12 is a more detailed second dimension folding diagram according to an embodiment of the present disclosure. The figure shows a second dimension folding process of the to-be-folded filter (64, 4, 4, 4) in the example of FIG. 11. The Ci of the to-be-folded filter is 4 and is required to be aligned to 64 according to the instruction alignment requirement. Therefore, the folding of $N_{total2}$=64+4=16 multiples is required. In the example of the figure, the second overall folding multiple 16 may be split to a second width dimension folding multiple Nw2 (4 times folding in the figure) in the convolution kernel width direction and a second height dimension folding multiple Nh2 (4 times folding in the figure) in the convolution kernel height direction.

As shown in the figure, in some embodiments, the folding in the width W dimension may be performed first. 1201 in the figure shows that single-layer W dimension data may be divided to four folds or four segments and then sequentially arranged in the input channel Ci dimension. After a to-be-folded filter 1200 is fully folded in the W dimension, an intermediate filter shown as 1210 may be obtained, whose dimensions may be represented as (64, 4, 1, 16).

Next, based on the intermediate filter 1210, the folding in the height H dimension may be performed. As shown in the figure, four times of folding may be performed in the H dimension. H dimension data of the intermediate filter 1210 is divided to four folds or four segments and then sequentially arranged in the input channel Ci dimension. During this folding process, each segment in these four segments of the H dimension corresponds to data obtained by folding in the single-layer W dimension, respectively. After the complete folding in the H dimension, a second folding filter shown as 1220 may be obtained, whose dimensions may be represented as (64, 1, 1, 64). The input channel Ci dimension of the second folded filter is 64, which satisfies the instruction alignment requirement.

The above describes a method of folding in the width W dimension first and then folding in the height H dimension. Those skilled in the art may understand that the folding may be performed in the H dimension first and then in the W dimension. Since the H dimension and the Ci dimension are not adjacent, compared with the folding in the W dimension first, additional processing is required, such as data transposition.

It may be seen from the second dimension folding process that the input channel Ci dimension of the second folding filter has changed. Therefore, accordingly, the input feature map is also required to perform the same type of second dimensional folding. Since the input feature map and the filter are folded at the same multiple, the output after the convolution operation between the input feature map of the second dimension folding and the second folding filter is the same as the convolution operation output of the two before folding, and the output result is not required to be further processed.

Further, it may be seen from the second dimension folding process in FIG. 12 that the input channel count of the second folding filter increases exponentially with respect to the input channel count of the to-be-folded filter. Therefore, the second dimension folding scheme of the embodiment of the present disclosure is especially suitable for a case where the input channel count Ci of the filter is relatively small. For example, the Ci is not larger than a third threshold A2, and the third threshold A2 is smaller than the instruction alignment value Aci. In some embodiments, the third threshold A25Aci/2. A practical result shows that the smaller the Ci, the bigger the improvement room compared with existing algorithms.

It may be seen from the second dimension folding process in FIG. 12 that, based on each parameter of the to-be-folded filter and the instruction alignment requirement, each parameter of the second folding filter may be determined.

First, the second overall folding multiple$N_{total2}$ may be determined based on the input channel count Ci of the to-be-folded filter and the instruction alignment value Aci.

In some embodiments, the second overall folding multiple $N_{total2}$ may be determined according to followings:

$$N_{total2} = Aci/Cia. \tag{2-1}$$

Cia is a value that Ci is aligned to the nearest value of $Act/2^n$, and n is a natural number.

As described above, in the embodiment of the present disclosure, the Ci is aligned to the instruction alignment value Aci by multiple foldings. When the Aci is $2^n$ times of the Ci, by a direct division, the overall multiple of the second dimension folding required may be obtained. For example, in the above example, Ci=4, so $N_{total2}$=64/4=16 multiples. When the Aci is not $2^n$ times of the Ci, the Ci is required to be aligned to the nearest value of $Aci/2^n$. For example, if the Aci is 64, $Aci/2^n$ includes 32, 16, 8, 4, and 2, and the Ci is required to be aligned to the nearest value among these numbers. For example, if Ci=3, the Ci is required to be aligned to 4; and if Ci=5, the Ci is required to be aligned to 8, and so on. After aligning and removing the Aci, the second overall folding multiple $N_{total2}$ may be obtained.

Then, after determined, according to the above consideration, the second overall folding multiple$N_{total2}$may be split to a second width dimension folding multipleNw2 in the convolution kernel width direction and a second height dimension folding multiple Nh2 in the convolution kernel height direction. The second overall folding multiple may be split according to different rules to realize different advantages.

In an embodiment, the folding multiple may be averagely split in the convolution kernel width direction and the convolution kernel height direction. For example, referring to examples in FIG. 11 and FIG. 12, the second overall folding multiple 16 is averagely split to 4 multiples in the width and 4 multiples in the height averagely.

In another embodiment, the folding multiple may be preferentially split in the convolution kernel width W direction. As the aforementioned data placement order NHWC, W and Ci dimensions are consecutive. Therefore, the folding in the W dimension is simple and requires only adjusting the dimensional representation of the filter, or dimensional recombination, without any other processing. Therefore, the folding multiple is preferentially split in the convolution kernel width W direction, thereby simplifying processing.

The splitting of the second overall folding multiple may be further affected by the following two factors.

On the one hand, the splitting of the second overall folding multiple depends on the convolution kernel size of the to-be-folded filter. If a value of each dimension (Kw and Kh) of the convolution kernel is not enough to implement foldings of expected multiples, other measures are required to be adopted.

For example, in the above example, if the splitting of the second overall folding multiple is in accordance with a principle of the width W direction first, the second overall folding multiple 16 may be split to 16 multiples in the width and 1 multiple in the height. However, since the convolution kernel width Kw of the to-be-folded filter is just 4, which means that four times of folding is supported at most, the allocation of the folding multiple is required to be adjusted. For example, the splitting multiple of the width W dimension may be decreased. For example, the folding multiple may be split to 4 multiples in the width, and 4 multiples in the height.

For another example, if the convolution kernel width dimension and/or the convolution kernel height dimension may not be folded for $2^n$ times, for example, if Kw or Kh is an odd number and is not divisible by 2, the convolution kernel is unable to be folded twice; and if Kw or Kh is not be divisible by 4, the convolution kernel is unable to be folded for four times. At this time, in order to fold the convolution kernel, completion based on the folding multiple is required.

Figure 13:
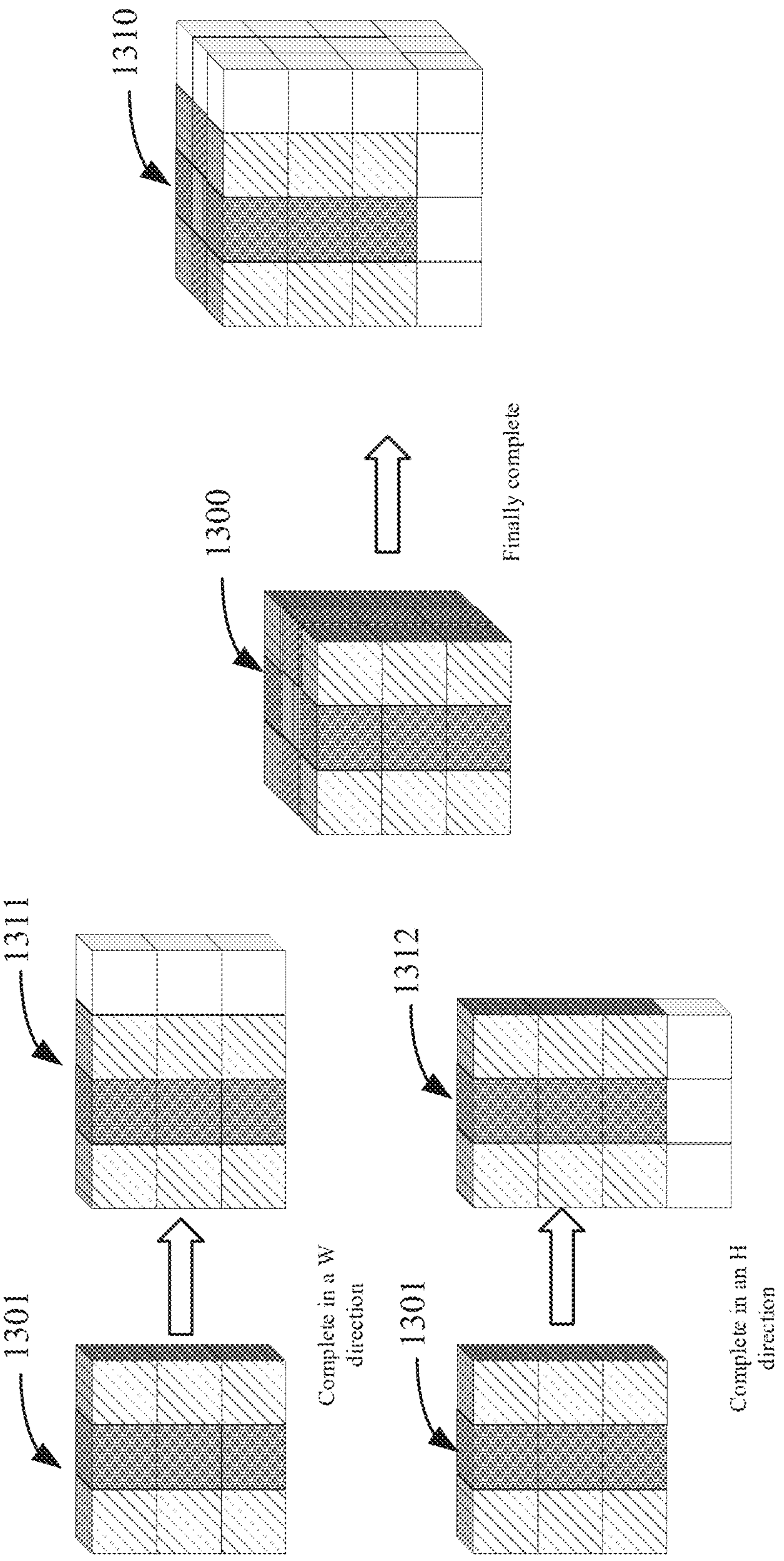
FIG. 13 is a schematic diagram of completing folding multiples of a convolution kernel according to an embodiment of the present disclosure.

FIG. 13 is a schematic diagram of completing folding multiples of a convolution kernel according to an embodiment of the present disclosure. In the example of the figure, the size of the convolution kernel of the to-be-folded filter is assumed to be 3×3, but both the width W dimension and the height H dimension are required to be folded for four times, and at this time, both the W and the H dimensions are required to be completed to a multiple of 4.

FIG. 13 is a splitting diagram of completing the H and the W directions. A to-be-folded single-layer convolution kernel 1301 is 3 in the W direction. In order to be folded for four times, the convolution kernel is required to be completed to 4. As shown in 1311, white squares represent completion blocks. Similarly, the to-be-folded single-layer convolution kernel 1301 is 3 in the H direction. In order to be folded for four times, the convolution kernel is required to be completed to 4. As shown in 1312, white squares represent completion blocks. When the convolution kernel is completed in both the H direction and the W direction at the same time, a convolution kernel 1310 may be obtained after the to-be-folded convolution kernel 1300 is finally completed. The size of the convolution kernel 1310 becomes 4×4, and the convolution kernel may be folded for four times in both the width and the height.

It may be seen form FIG. 13 that the completion of the convolution kernel may introduce invalid values, thereby bringing invalid redundant computing.

Therefore, in some embodiments, in order to implement the folding, the second overall folding multiple may be split to make the completion amount caused by the alignment of the folding multiple as small as possible. For example, assuming that the size of the to-be-folded convolution kernel is 1×6, the second overall folding multiple is 16, if the second overall folding multiple is split to 4 multiples in the H direction and 4 multiples in the W direction, the to-be-folded convolution kernel is required to be completed to 4×8, which means that each layer will add 26 zeros. If the second overall folding multiple is split to 2 multiples in the H direction and 8 multiples in the W direction, the to-be-folded convolution kernel is only required to be completed to 2×8, which means that each layer adds 10 zeros. If the second overall folding multiple is split to 1 multiple in the H direction and 16 multiples in the W direction, the to-be-folded convolution kernel is required to be completed to 1×16, which means that each layer also adds 10 zeros. In the case of the same completion amount, the folding multiple may be allocated to the W direction preferentially. For example, the folding multiple is split to 1 multiple in the H direction and 16 multiples in the W direction.

On the other hand, actual effective multiples of the second dimension folding scheme of the embodiment of the present disclosure is related to the convolution stride. When the convolution stride is unable to be divisible by corresponding folding multiples, the folding method of the convolution kernel is not changed. However, there will be overlap in the folding of the input feature map, so there will be some redundancy in the convolution operation.

Figure 14:
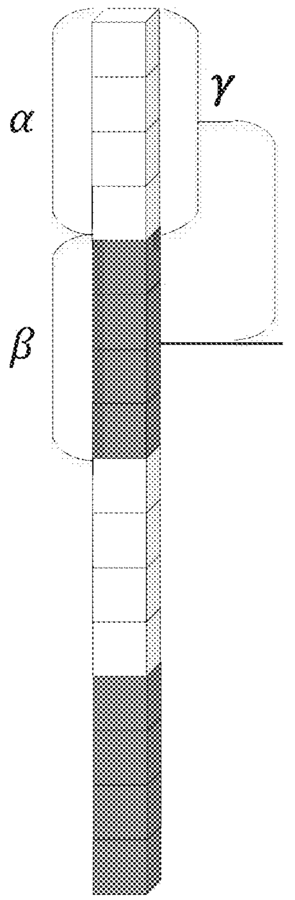
FIG. 14 is a schematic diagram showing effects of a convolution stride on effective multiples according to an embodiment of the present disclosure.

FIG. 14 is a schematic diagram showing effects of a convolution stride on effective multiples according to an embodiment of the present disclosure. The figure shows the folding method that the input feature map includes overlapping areas by taking the H direction as an example. As shown in the figure, when the convolution stride Sy=4 in the H direction, two consecutive pieces of data, which are a and B, are folded for four times in the H direction, and there is no overlapping area. However, when the convolution stride Sy=2 in the H direction, two consecutive pieces of data, which are γ and δ, are folded for four times in the H direction, and there is an overlapping area. The size of the overlapping area is the folding multiple in that direction minus the convolution stride in that direction At this time, the folding multiple in the H direction and the W direction may be arranged flexibly. For example, the folding multiple is allocated to a higher dimension preferentially, which avoids redundant computing in a low dimension as much as possible.

For example, for the data placement order NHWC, the H dimension is higher than the W dimension. If Sx=2, Sy=2, and $N_{total}2=16$, the convolution kernel may be allocated to be folded twice in the W dimension and eight times in the H dimension. As such, the redundant computing caused by the overlapping areas may be distributed in the H dimension. At this time, when the redundant computing is performed, since the H dimension is higher, more data is required to be read during each operation, which helps improve data access I/O efficiency.

In conclusion, in the embodiment of the present disclosure, the folding multiples in the H dimension and the W dimension may be configured flexibly based on all kinds of rules described above to avoid redundant computing as much as possible and maximize the improvement of computing efficiency.

In some embodiments, the second overall folding multiple may be split by: preferentially determining the folding multiple in the W direction. For example, the second overall folding multiple $N_{total2}$ may be split averagely to determine the folding multiple Nw2 in the W direction:

$$Nw2 = \begin{cases} \sqrt{N_{total2}} & \text{if } \sqrt{N_{total2}} \text{ is an integer} \\ \sqrt{\frac{N_{total2}}{2}} * 2 & \text{if } \sqrt{N_{total2}} \text{ is not an integer} \end{cases}. \quad (2\text{-}2)$$

For example, the following description is made by taking the to-be folded filter (64, 6, 6, 4), the convolution stride ($S_x$', $S_x$')=(2, 2), and the instruction alignment value Aci=64 as an example. At this time, $$N_{total2} = \frac{Aci}{Ci} = \frac{64}{4} = 16,\ Nw2 = \sqrt{N_{total2}} = 4.$$

Next, the size and the convolution stride of the W direction may be determined accordingly.

According to requirements, the convolution kernel width $k_w$ of the to-be-folded filter may be aligned to the multiple of the folding multiple Nw2 in the W direction, which is recorded as $k_{wa}$. Then, the size $k_w$" of the convolution kernel W dimension after the second dimension folding is computed:

$$k_w'' = k_{wa}/Nw2. \quad (2\text{-}3)$$

Continuing the above example, since $k_w$' is 6, and Nw2 is 4, the completion operation is required to be performed; and at this time, $$k_{wa} = 8,\ k_w'' = k_{wa}/Nw2 = 2.$$

Next, the convolution stride$S_x$" of the W direction of the second folding filter may be determined according to followings:

$$S_x'' = \begin{cases} 1, & \text{if } S_x'/Nw2 < 1 \\ \frac{S_x''}{Nw2}, & \text{others} \end{cases}. \quad (2\text{-}4)$$

Continuing the above example, at this time $S_x$'/Nw2=2/4<1, so $S_x$"=1. This means that, if the convolution kernel is folded for four times in the W dimension, there is an overlapping area, and redundant computing is introduced. The actual effective folding multiple in the W dimension is $S_x$'/$S_x$"=2/1=2, instead of 4 multiples corresponding to four times of folding.

At this time, the folding multiple may be adjusted. For example, the W direction may be maintained to achieve the maximum effective folding multiple 2 without overlapping areas, and the rest of required folding multiples may be allocated to the H direction. Therefore, the folding multiple in the H direction may be computed based on the effective folding multiple in the W direction.

$$Nh2 = N_{total2}/(S_x'/S_x''). \quad (2\text{-}5)$$

In the above example, Nh2=16/2=8, so the folding multiple in the H direction is 8.

At this time, the folding multiple in the W direction may be updated accordingly:

$$Nw2 = N_{total2}/Nh2. \quad (2\text{-}6)$$

In the above example, Nw2=16/8=2, which is equal to its maximum effective folding multiple. According to this folding multiple allocation method, there will be no overlapping area in the W direction, but there will be more overlapping in the H direction.

After the second folding multiple Nw2 and Nh2 of the W direction and the H direction are determined, other parameters in each dimension may be computed accordingly, which include the size of the dimension and the convolution stride.

Similar to the above method of computing the size and the convolution stride of the W dimension, according to requirements, the convolution kernel width $k_w$' of the to-be-folded filter may be aligned to the multiple of the folding multiple Nw2 of the W direction first, which is recorded as $k_{wa}$; and the convolution kernel height $k_h$' of the to-be-folded filter is aligned to the multiple of the folding multiple Nh2 of the H direction, which is recorded as $k_{ha}$. Then, a size $k_w$" of the W dimension and a size $k_h$" of the H dimension of the convolution kernel after the second dimension folding are computed according to followings:

$$k_w'' = k_{wa}/Nw2. \quad (2\text{-}7)$$

$$k_h'' = k_{ha}/Nh2. \quad (2\text{-}8)$$

Continuing the above example, since $k_w$' is 6, and Nw2 is 2, which is divisible, the completion operation is not required; and at this time, $k_{wa}$=6, and $k_w$"=6/2=3. For the H direction, since $k_h$' is 6, and Nh2 is 8, which is not divisible, the completion operation is required; and at this time, $k_{ha}$=8, and $k_h$"=8/8=1.

Next, the convolution stride $S_x$" of the W direction and the convolution stride $S_y$" of the H direction of the second folding filter may be determined according to followings:

$$S''_x = \begin{cases} 1, & \text{if } S'_x/Nw2 < 1 \\ S'_x/Nw2, & \text{others} \end{cases}. \quad (2\text{-}9)$$

$$S''_y = \begin{cases} 1, & \text{if } S'_y/Nh2 < 1 \\ S'_y/Nh2, & \text{others} \end{cases}. \quad (2\text{-}10)$$

For the above example, $$S''_x = S'_x / Nw2 = 2/2 = 1;$$

and since $S_y'/Nh2=2/8<1$, $$S''_y = 1.$$

The above describes how to design each parameter of the second folding filter according to the instruction alignment requirement.

The above describes a scheme of adjusting the filter through the second dimension folding according to the embodiment of the present disclosure. In some embodiments, the second folding filter may be generated offline. For example, in the process of inference using the neural network model, the convolution operation may be performed by using the preset, offline-generated second folding filter and the input feature map that also performs the same second dimension folding online, so as to perform the inference process. In some embodiments, the second folding filter may be generated online. For example, in the process of training the neural network model, the second dimension folding may be performed on the filter in the convolution layer online, and the same second dimension folding may also be performed on training data online, so as to perform the training process.

No matter in which process the first folding filter of the embodiment of the present disclosure is used, Ci dimension alignment by the second dimension folding may greatly optimize the computing amount of the convolution operation. In terms of the convolution computing amount, the scheme of the embodiment of the present disclosure and performance of existing convolution operations are compared in the following.

P represents the convolution computing amount, $A_{ci}$ represents a value of Ci after alignment, $A_{co}$ represents a value of Co after alignment, and then $$P = n * A_{ci} * A_{CO} * H_o * W_o * k_w * k_h. \quad (2\text{-}11)$$

The hardware that adopts the placement order of NHWC where the Ci dimension is the lowest dimension, with the requirement of vector instruction alignment, is always required to be aligned to Act, so Act aims at the requirement of the vector instruction alignment; and artificial intelligence computing acceleration hardware usually has a plurality of parallel high-performance convolution computing units, so Aco aims at the alignment requirement of the Co dimension of the convolution kernel, and a value of the Co dimension of the convolution kernel is a count of the parallel high-performance convolution computing units.

Before optimization, the computing amount of the existing convolution operation is:

$$P_{before2} = n * A_{ci} * A_{CO} * H_o * W_o * k'_w * k'_h. \quad (2\text{-}12)$$

After optimization by adopting the second dimension folding scheme of the embodiment of the present disclosure, the computing amount of the convolution operation is:

$$P_{after2} = n * A_{ci} * A_{CO} * H_o * W_o * k''_w * k''_h = n * A_{ci} * A_{CO} * H_o * W_o * alignTo(k'_w, Nw2) * alignTo(k'_h, Nh2)/(Nw2 * Nh2). \quad (2\text{-}13)$$

After the second dimension folding, the optimization rate of the performance is:

$$(P_{before2} - P_{after2})/P_{before2} = 1 - \frac{P_{after2}}{P_{before2}} = 1 - alignTo(k'_w, Nw2) * alignTo(k'_h, Nh2)/(Nw2 * Nh2 * k'_w * k'_h).$$

Taking the above examples with reference to FIG. 11 and FIG. 12 as examples, before optimization, $P_{before2}$=1*64*64*ho*wo*4*4 (Sx, Sy=4, 4), and after optimization, $P_{after2}$=1*64*64*ho*wo*1*1 (Sx', Sy'=1, 1)=1*64*64*ho*wo*4*4*(1/16).

The convolution computing amount of the decreased convolution computing units is 93.75%.

It may be understood that the examples in FIG. 11 and FIG. 12 show the second dimension folding processing in ideal conditions, where the convolution stride fully satisfies the folding requirements, and the size of the convolution kernel and the size of the input feature map are not required to perform the folding multiple alignment. In the actual situation, depending on a value of a specific parameter, the actual optimization rate will be lower than the above peak optimization rate 93.75%.

It may be known from the above comparison on the computing amount that the second folding filter scheme provided by the embodiment of the present disclosure may effectively save the computing amount of the convolution units, thereby improving the computing performance of the convolution operation.

The above describes the first dimension folding and the second dimension folding respectively according to the embodiment of the present disclosure. It may be known from the above description that, when the first dimension folding is performed separately, the convolution kernel of the obtained first folded filter will expand, and especially when the convolution stride before folding is large, the convolution kernel will expand to a very large size, and the convolution stride will also expand, which brings some redundancy computing and increases the access time of the loaded filter. On the contrary, when the second dimension folding is performed separately, the convolution kernel of the obtained second folded filter will shrink, and the convolution stride may also shrink. Therefore, the combination of the first dimension folding and the second dimension folding may reduce the expansion of the convolution kernel caused by the first dimension folding, and thus reduce the access stock of the loaded filter.

On the other hand, when the second dimension folding is performed separately, the effective folding multiple of the second dimension folding depends on the convolution stride.

If the convolution stride is too small, there will be repeated computing when the convolution operation is performed with the folded input feature map, thereby decreasing benefits obtained through the folding. The above analysis shows that the first dimension folding expands the convolution kernel and the convolution stride, and the convolution stride after the first dimensional folding must be even. Therefore, the combination of the first dimension folding and the second dimension folding may increase the effective multiple of the second dimension folding, and the folding method of the convolution kernel will not be changed when the convolution stride is odd, so the optimization effect of the second dimension folding may be maximized.

Based on the above analysis, the first dimension folding and the second dimension folding may be combined to make up for shortcomings and achieve maximum optimization effect.

In an embodiment, the first dimension folding is performed first to obtain the expanded convolution kernel and convolution stride; and then the second dimension folding is performed based on the first dimension folding, and at this time, the convolution kernel and the convolution stride may be decreased. Therefore, the I/O amount of the loaded filter may not be increased in the case of satisfying the instruction alignment requirement of the input channel dimension and the hardware alignment requirement of the output channel dimension. Meanwhile, the redundant computing generated by the folding process may be offset, thereby maximizing computing performance.

For example, it is assumed that the original filter is (4, 3, 3, 3), and the convolution stride is (1, 1). Referring to the above description, after the first dimension folding (where Nw1=Nh1=4), the obtained first folding filter is (64, 6, 6, 4), and the convolution stride is (4, 4). Next, the second dimension folding (where Nw2=Nh2=4) is performed on the first folding filter. As such, the obtained second folding filter is (64, 2, 2, 64), and the convolution stride is (1, 1). Compared with the original filter, the input channel dimension and the output channel dimension of the second folding filter are both aligned to each alignment value (here, the alignment value is 64). Moreover, the size of the convolution kernel does not expand but decreases to 2×2, and the convolution stride does not expand either, which is (1, 1) in this example.

In another embodiment, the second dimension folding may be performed before the first dimension folding. However, such implementation may not take full advantage of convolution kernel expansion and convolution stride expansion caused by first dimension folding, which is not conducive to performance optimization.

When the first dimension folding is performed before the second dimension folding, in terms of the convolution computing amount, the obtained performance optimization rate may be computed as following:

$$Pa = 1 - \left(alignTo(k'_w, Nw2) * alignTo(k'_h, Nh2)/Nw2 * Nh2 * k'_w * k'_h\right)\right) * \left(k'_w * k'_h/(Nh1 * Nw1 * k_w, k_h)\right) = 1 - alignTo(k'_w, Nw2) * alignTo(k'_h, Nh2)/(Nw2 * Nh2 * Nh1 * Nw1 * k_w * k_h)\right)$$

Taking the above example of performing the first dimension folding and the second dimension folding when the original filter is (4, 3, 3, 4) and the convolution stride is (1,1) as an example, the performance optimization rate is:

$$Pa = 1 - alignTo(k'_w, Nw2) * alignTo(k'_w, Nh2)/(Nw2 * Nh2 * Nh1, Nw1 * k_w * k_h) = 1 - alignTo(6, 4) * alignTo(6, 4)/(4 * 4 * 4 * 4 * 3 * 3) = 1 - (8 * 8)/(4 * 4 * 4 * 4 * 3 * 3) = 1 - 1/36 = 97.22\%$$

The embodiment of the present disclosure also provides a data processing apparatus for executing the neural network model, and a method for performing the neural network model implemented by the data processing apparatus.

Figure 15:
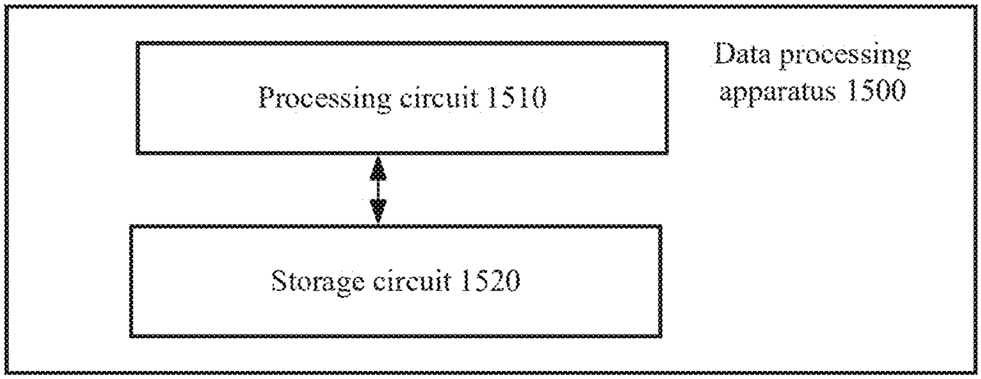
FIG. 15 is an exemplary structural diagram of a data processing apparatus capable of implementing an embodiment of the present disclosure.

FIG. 15 is an exemplary structural diagram of a data processing apparatus capable of implementing an embodiment of the present disclosure. As shown in FIG. 15, a data processing apparatus 1500 includes a processing circuit 1510 and a storage circuit 1520.

The processing apparatus 1510 is responsible for processing all kinds of functions on the data processing apparatus 1500, including, but not limited to, control, decoding, operation and the like. The processing apparatus 1510, for example, may include the control unit 31 and/or the operation unit 32 in FIG. 3.

In some embodiments, the processing circuit 1510 may be configured to perform the second dimension folding on the input feature map to obtain a folding feature map, perform the convolution operation on the folding feature map by using the folding filter of the embodiment of the present disclosure to obtain the intermediate result, and perform dimension anti-folding on the intermediate result to obtain the output feature map.

The storage circuit 1520 may be configured to store or move related data and may be, for example, all kinds of random-access memories (RAMs) shown in FIG. 3 or FIG. 5 or may be called on-chip cache. In some embodiments, the storage circuit 1520 may be configured to store the folding filter in the convolution layer of the neural network model. The folding filter is generated by the first dimension folding and the second dimension folding of the original filter. The first dimension folding includes synthesizing the plurality of extended filters obtained by moving the convolution stride many times. The second dimension folding includes rearranging data of the width dimension and/or the height dimension to the input channel dimension. For example, the processing circuit 1510 may implement data rearrangement or dimension folding in the width dimension through dimensional recombination. The processing circuit 1510 may implement data rearrangement or dimension folding of the height dimension through dimensional transposition.

In some embodiments, the data processing apparatus 1500 may be configured to perform the training process of the neural network model. At this time, the processing circuit 1510 may be configured to perform the first- and second dimension folding processing of the embodiment of the present disclosure on the filter in the convolution layer of the neural network model online in training and perform the second dimension folding processing of the embodiment of the present disclosure on the training data. Then the obtained folding filter is used to perform the convolution operation on the folded training data to perform the training process. Specific folding processes implemented by processing circuit 1510 may refer to the above description and will not be repeated herein.

In some embodiments, the data processing apparatus 1500 may be configured to perform the inference process of the neural network model. At this time, the processing circuit 1510 may be configured to perform the second dimension folding processing on input neuron first, and then perform the convolution operation on the folded input neuron by directly using the folding filter that has been stored in the storage circuit 1520 to perform the inference process. The second dimension folding method of the input neuron is the same as the second dimension folding method of the stored folding filter.

The intermediate result obtained through the convolution operation performed by using the folding filter requires the dimensional rearrangement to obtain the final output feature map. Specific rearrangement processing may refer to the above description and will not be repeated herein.

Figure 16:
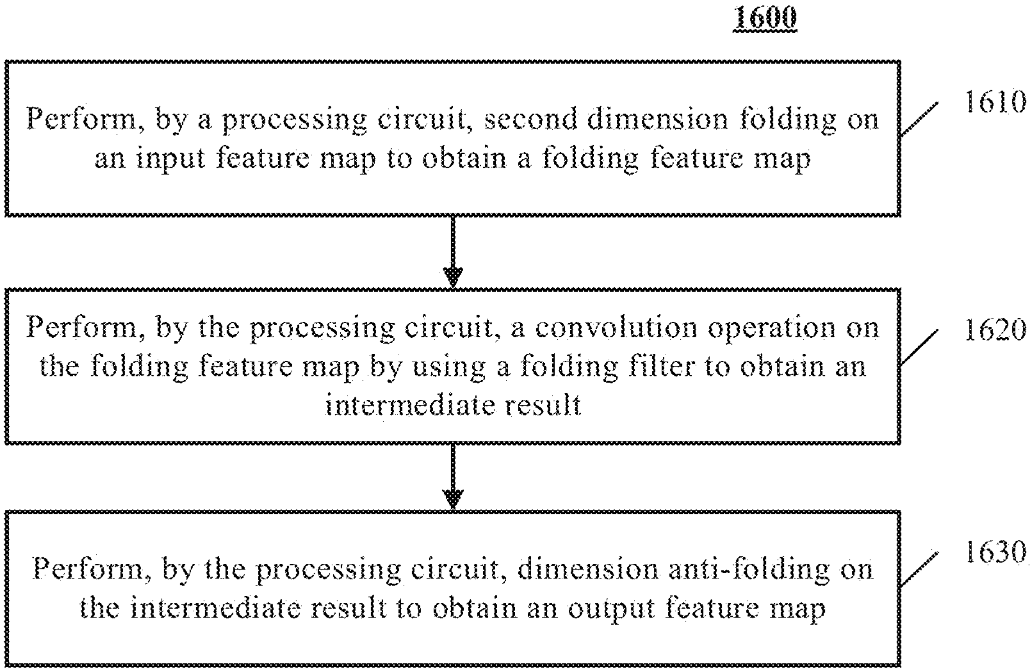
FIG. 16 is an exemplary flowchart of a data processing method according to an embodiment of the present disclosure.

FIG. 16 is an exemplary flowchart of a data processing method according to an embodiment of the present disclosure.

As shown in the figure, a data processing method 1600 includes a step 1610, where the processing circuit performs the second dimension folding on the input feature map to obtain the folding feature map.

Then, in a step 1620, the processing circuit performs the convolution operation on the folding feature map by using the folding filter stored in the storage circuit to obtain the intermediate result. The folding filter is generated by the first dimension folding and the second dimension folding of the original filter. The first dimension folding includes synthesizing the plurality of extended filters obtained by moving the convolution stride many times. The second dimension folding includes rearranging data of the width dimension and/or the height dimension to the input channel dimension.

Then, in a step 1630, the processing circuit performs the dimension anti-folding on the intermediate result to obtain the output feature map.

Those skilled in the art may understand that the folding method of the filter and the dimensional rearrangement of the intermediate result of the embodiment of the present disclosure described with reference to the drawings may also be applied to the data processing apparatus of FIG. 15 and the data processing method of FIG. 16, which are not repeated herein.

The present disclosure also provides a chip, including the data processing apparatus of any embodiment described with reference to the drawings. Further, the present disclosure also provides a board card, including the chip.

According to different application scenarios, an electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiogram. The electronic device or apparatus of the present disclosure may be further applied to Internet, Internet of Things, data center, energy, transportation, public management, manufacturing, education, power grid, telecommunications, finance, retail, construction sites, medical, and other fields. Further, the electronic device or apparatus of the present disclosure may be further used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with hardware information of the terminal device and/or the edge device. As such, according to the hardware information of the terminal device and/or the edge device, appropriate hardware resources may be matched from hardware resources of the cloud device to simulate hardware resources of the terminal device and/or the edge device, so as to complete unified management, scheduling, and collaborative work of terminal-cloud integration or cloud-edge-terminal integration.

It is required to be explained that for the sake of brevity, the present disclosure describes some method embodiments as a series of actions and combinations thereof, but those skilled in the art may understand that the solution of the present disclosure is not limited by an order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as optional embodiments; in other words, actions and units involved thereof are not necessarily required for the implementation of a certain solution or some solutions of the present disclosure. Additionally, according to different solutions, descriptions of some embodiments of the present disclosure have their own emphasis. In view of this, those skilled in the art may understand that for a part that is not described in detail in a certain embodiment of the present disclosure, reference may be made to related descriptions in other embodiments.

In terms of specific implementations, according to the present disclosure and under the teaching of the present disclosure, those skilled in the art may understand that several embodiments disclosed in the present disclosure may be implemented through other methods that are not disclosed in the present disclosure. For example, for units in the electronic device or apparatus embodiment, the present disclosure divides the units on the basis of considering logical functions, but there may be other ways of division during actual implementations. For another example, a plurality of units or components may be combined or integrated into another system, or some features or functions in the units or components may be selectively disabled. With respect to a connection between different units or components, the connection discussed above in combination with drawings may be direct or indirect coupling between the units or components. In some scenarios, the direct or indirect coupling involves a communication connection using an interface. The communication interface may support electrical, optical, acoustic, magnetic, or other forms of signal transmission.

In the present disclosure, units described as separate components may be or may not be physically separated. Components shown as units may or may not be physical units. The components or units may be located in the same position or distributed to a plurality of network units. Additionally, according to actual requirements, some or all of the units may be selected for achieving the purpose of the solution described in embodiments of the present disclosure.

Additionally, in some scenarios, a plurality of units in the embodiments of the present disclosure may be integrated into one unit, or each of the units may be physically separated.

In some implementation scenarios, the integrated unit may be implemented in the form of a software program unit. If the integrated unit is implemented in the form of the software program unit and sold or used as an independent product, the integrated unit may be stored in a computer-readable memory. Based on such understanding, if the solution of the present disclosure is embodied in the form of a software product (such as a computer-readable storage medium), the software product may be stored in a memory. The software product may include several instructions used to enable a computer device (which may be a personal computer, a server, or a network device, and the like) to perform part or all of steps of the method of the embodiments of the present disclosure. The foregoing memory includes but is not limited to an USB, a flash disk, a read only memory (ROM), a random-access memory (RAM), a mobile hard disk, a magnetic disk, or an optical disc, and other media that may store a program code.

In some other implementation scenarios, the integrated unit may be implemented in the form of hardware. The hardware may be a specific hardware circuit, which may include a digital circuit and/or an analog circuit. The physical implementation of a hardware structure of the circuit includes but is not limited to a physical component. The physical component includes but is not limited to a transistor, or a memristor, and the like. In view of this, various apparatuses (such as the computing apparatus or other processing apparatuses) described in the present disclosure may be implemented by an appropriate hardware processor, such as a central processing unit (CPU), a graphics processing unit (GPU), a field-programmable gate array (FPGA), a digital signal processor (DSP), and an application-specific integrated circuit (ASIC), and the like. Further, the storage unit or the storage apparatus may be any appropriate storage medium (including a magnetic storage medium or a magneto-optical storage medium, and the like), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), the ROM, and the RAM, and the like.

The foregoing may be better understood according to following articles:

Article A1. A data processing apparatus for executing a neural network model, including:

a storage circuit configured to store a folding filter of a convolution layer of the neural network model, where the folding filter is generated by first dimension folding and second dimension folding of an original filter, where the first dimension folding includes synthesizing a plurality of extended filters obtained by moving a convolution stride for many times, and the second dimension folding includes rearranging data of a width dimension and/or a height dimension to an input channel dimension; and a processing circuit configured to:

perform the second dimension folding on an input feature map to obtain a folding feature map;

perform a convolution operation on the folding feature map by using the folding filter to obtain an intermediate result; and perform dimension anti-folding on the intermediate result to obtain an output feature map.

Article A2. The data processing apparatus of article A1, where the folding filter is generated by first performing the first dimension folding on the original filter to obtain a first folding filter and then performing the second dimension folding on the first folding filter.

Article A3. The data processing apparatus of article A2, where the processing circuit is configured to perform the first dimension folding by:

moving the original filter by horizontal convolution stride for Nw1−1 times in a convolution kernel width direction, and/or moving the original filter by vertical convolution stride for Nh1−1 times in a convolution kernel height direction, to obtain $N_{total1}$ extended filters, where $N_{total1}$=Nw1×Nh1, and Nw1 andNh1 are natural numbers; and synthesizing the $N_{total1}$extended filters into the first folding filter in an output channel dimension.

Article A4. The data processing apparatus of article A3, where a size of an output channel dimension of the original filter does not exceed a first threshold A1, and a size of an output channel dimension of the first folding filter equals a second threshold Aco, where the first threshold A1 is less than the second threshold Aco.

Article A5. The data processing apparatus of article A4, where the processing circuit is further configured to:

determine a first overall folding multiple $N_{total1}$ based on an output channel count Co of the original filter and the second threshold Aco;

split the first overall folding multiple $N_{total1}$ to a first width dimension folding multiple Nw1and a first height dimension folding multiple Nh1;

determine a convolution stride of the first folding filter based on Nw1, Nh1, and a convolution stride of the original filter; and determine a size of a convolution kernel of the first folding filter based on Nw1, Nh1, and a convolution kernel and the convolution stride of the original filter.

Article A6. The data processing apparatus of article A5, where the processing circuit is further configured to determine the first overall folding multiple $N_{total1}$ as follows: $N_{total1}$=Aco/Coa, where Coa is a value that Co is aligned to the nearest value of Aco/$2^n$, and n is a natural number.

Article A7. The data processing apparatus of any one of articles A5-A6, where the processing circuit is further configured to split the first overall folding multiple $N_{total1}$ according to any one of following rules or combinations of the rules:

preferentially splitting the first overall folding multiple to the convolution kernel width dimension;

preferentially splitting the first overall folding multiple to a direction with a small convolution stride;

averagely splitting the first overall folding multiple to the convolution kernel width direction and the convolution kernel height direction; or splitting the first overall folding multiple to minimize the size of the convolution kernel of the first folding filter.

Article A8. The data processing apparatus of any one of articles A5-A7, where the processing circuit is further configured to determine the convolution stride of the first folding filter as follows:

$$S_x' = S_x * Nw1,$$

$$S_y' = S_y \times Nh1,$$

where $S_x$ is a horizontal convolution stride of the original filter, $S_y$ is a vertical convolution stride of the original filter, $S_x'$ a horizontal convolution stride of the first folding filter, and $S_y'$ is a vertical convolution stride of the first folding filter.

Article A9. The data processing apparatus of any one of articles A5-A8, where the processing circuit is further configured to determine the size of the convolution kernel of the first folding filter as follows:

$$k_w' = k_w + (Nw1 - 1) * S_x,$$

$$k_h' = k_h + (Nh1 - 1) * S_y,$$

where $S_x$ is the horizontal convolution stride of the original filter, $S_y$ is the vertical convolution stride of the original filter, $k_w$ is a convolution kernel width of the original filter, $k_h$ is a convolution kernel height of the original filter, $k_w'$ is a convolution kernel width of the first folding filter, and $k_h'$ is a convolution kernel height of the first folding filter.

Article A10. The data processing apparatus of any one of articles A4-A9, where the second threshold Aco is determined based on a count of convolution operation units in the processing circuit, and the first threshold A1≤Aco/2.

Article A11. The data processing apparatus of any one of articles A1-A10, where a size of an input channel dimension of the original filter does not exceed a third threshold A2, and a size of an input channel dimension of the folding filter equals a fourth threshold Aci, where the third threshold A2 is less than the fourth threshold Aci.

Article A12. The data processing apparatus of article A11, where the processing circuit is configured to perform the second dimension folding as follows:

determining a second overall folding multiple $N_{total2}$ based on a size Ci of an input channel dimension of to-be-folded multi-dimensional data and the fourth threshold Aci;

splitting the second overall folding multiple $N_{total2}$ to a second width dimension folding multiple Nw2 and a second height dimension folding multiple Nh2;

determining a width dimension size and a height dimension size of folded multi-dimensional data based on Nw2, Nh2, and a width dimension size and a height dimension size of the to-be-folded multi-dimensional data; and determining a folded convolution stride of the convolution operation based on Nw2, Nh2, and an original convolution stride of the convolution operation.

Article A13. The data processing apparatus of article A12, where the processing circuit is further configured to determine the second overall folding multiple $N_{total2}$ as follows:

$N_{total2}$=Aci/Cia, where Cia is a value that Ci is aligned to the nearest value of Aci/$2^n$, and n is a natural number.

Article A14. The data processing apparatus of any one of articles A12-A13, where the processing circuit is further configured to split the second overall folding multiple $N_{total2}$ according to any one of following rules or combinations of the rules:

preferentially splitting the second overall folding multiple to the width dimension;

averagely splitting the second overall folding multiple to the width dimension and the height dimension;

splitting the second overall folding multiple to make a completion amount caused by alignment of folding multiples as small as possible; or splitting the second overall folding multiple to make a convolution stride based on a width dimension of the first folding filter be divisible by a folding multiple of the width dimension.

Article A15. The data processing apparatus of any one of articles A12-A14, where the processing circuit is further configured to determine the width dimension size and the height dimension size of the folded multi-dimensional data as follows:

$$k_w'' = k_{wa}/Nw2, \tag{7}$$

$$k_h'' = k_{ha}/Nh2, \tag{8}$$

where $k_w''$ is the width dimension size of the folded multi-dimensional data, $k_h''$ is the height dimension size of the folded multi-dimensional data, $k_{wa}$ is a value that a width dimension size $k_w'$ of the to-be-folded multi-dimensional data is aligned to the nearest value of the width dimension folding multiple Nw2, and kha is a value that a height dimension size $k_h'$ of the to-be-folded multi-dimensional data is aligned to the nearest value of the height dimension folding multi-pleNh2.

Article A16. The data processing apparatus of any one of articles A12-A15, where the processing circuit is further configured to determine a convolution stride of the folded multi-dimensional data as follows:

$$S_x'' = \begin{cases} 1, & \text{if } S_x'/Nw2 < 1 \\ S_x'/Nw2, & \text{others} \end{cases}, \tag{9}$$

$$S_y'' = \begin{cases} 1, & \text{if } S_y'/Nh2 < 1 \\ S_y'/Nh2, & \text{other} \end{cases}, \tag{10}$$

where $S_x'$ is a convolution stride of a width dimension of a convolution operation before the second dimension folding, $S_y'$ is a convolution stride of a height dimension of the convolution operation before the second dimension folding respectively, $S_x''$ is a convolution stride of a width dimension of a convolution operation after the second dimension folding, and $S_y''$ a convolution stride of a height dimension of the convolution operation after the second dimension folding.

Article A17. The data processing apparatus of any one of articles A12-A16, where the to-be-folded multi-dimensional data is the first folding filter and/or the input feature map.

Article A18. The data processing apparatus of any one of articles A11-A17, where the fourth threshold Aci is determined based on an instruction alignment requirement, and the third threshold A2≤Aci/2.

Article A19. The data processing apparatus of any one of articles A1-A18, where the processing circuit is further configured to:

perform dimensional recombination on the intermediate result to implement the dimension anti-folding to obtain the output feature map when the extended filters only include extended filters obtained by moving in the convolution kernel width direction.

Article A20. The data processing apparatus of any one of articles A1-A18, where the processing circuit is further configured to:

perform dimensional transposition on the intermediate result to implement the dimension anti-folding to obtain the output feature map when the extended filters include extended filters obtained by moving in the convolution kernel height direction.

Article A21. The data processing apparatus of any one of articles A1-A18, where the processing circuit is further configured to:

perform dimensional recombination and dimensional transposition on the intermediate result to implement the dimension anti-folding to obtain the output feature map when the extended filters include extended filters obtained by moving in the convolution kernel width direction and extended filters obtained by moving in the convolution kernel height direction.

Article A22. The data processing apparatus of any one of article A20 or article A21, where the processing circuit is further configured to:

transpose a feature on an output channel dimension of the intermediate result to the height dimension.

Article A23. The data processing apparatus of any one of articles A1-A22, where the processing circuit is further configured to:

implement the second dimension folding in the width dimension through the dimensional recombination; and/or implement the second dimension folding in the height dimension through the dimensional transposition.

Article A24. The data processing apparatus of any one of articles A1-23, where the size of the input channel dimension of the original filter equals the size of the input channel dimension of the first folding filter; and the size of the output channel dimension of the first folding filter equals the size of the output channel dimension of the folding filter.

Article A25. The data processing apparatus of any one of articles A1-A24, where the folding filter is generated offline or online.

Article A26. A chip, including the data processing apparatus of any one of articles A1-A25.

Article A27. A board card, including the chip of article A26.

Article A28. A method for executing a neural network model, which is implemented by a data processing apparatus, where the data processing apparatus includes a storage circuit and a processing circuit, where a folding filter of a convolution layer of the neural network model is stored in the storage circuit, where the folding filter is generated by first dimension folding and second dimension folding of an original filter, where the first dimension folding includes synthesizing a plurality of extended filters obtained by moving a convolution stride for many times, and the second dimension folding includes rearranging data of a width dimension and/or a height dimension to an input channel dimension; and the method includes:

performing, by the processing circuit, the second dimension folding on an input feature map to obtain a folding feature map, where performing, by the processing circuit, a convolution operation on the folding feature map by using the folding filter stored in the storage circuit to obtain an intermediate result; and performing, by the processing circuit, dimension anti-folding on the intermediate result to obtain an output feature map.

Article A29. The method of article A28, where the folding filter is generated by first performing the first dimension folding on the original filter to obtain a first folding filter and then performing the second dimension folding on the first folding filter.

Article A30. The method of article A29, further including: performing, by the processing circuit, the first dimension folding as follows:

moving the original filter by horizontal convolution stride for Nw1−1 times in a convolution kernel width direction, and/or moving the original filter by vertical convolution stride for Nh1−1 times in a convolution kernel height direction, to obtain $N_{total1}$ extended filters, where $N_{total1}$=Nw1×Nh1, and Nw1and Nh1 are natural numbers; and synthesizing the $N_{total1}$ extended filters into the first folding filter in an output channel dimension.

Article A31. The method of article A30, where a size of an output channel dimension of the original filter does not exceed a first threshold A1, and a size of an output channel dimension of the first folding filter equals a second threshold Aco, where the first threshold A1 is less than the second threshold Aco.

Article A32, the method of article A31, further including:

determining a first overall folding multiple $N_{total1}$ based on an output channel count Co of the original filter and the second threshold Aco;

splitting the first overall folding multiple $N_{total1}$ to a first width dimension folding multipleNw1 and a first height dimension folding multipleNh1;

determining a convolution stride of the first folding filter based on Nw1, Nh1, and a convolution stride of the original filter; and determining a size of a convolution kernel of the first folding filter based on Nw1, Nh1, and a convolution kernel and the convolution stride of the original filter.

Article A33. The method of article A32, further including: determining, by the processing circuit, the first overall folding multiple $N_{total1}$ as follows:

$N_{total1}$=Aco/Coa, where Coa is a value that Co is aligned to the nearest value of Aco/$2^n$, and n is a natural number.

Article A34. The method of any one of articles A32-A33, further including: splitting, by the processing circuit, the first overall folding multiple $N_{total1}$ according to any one of following rules or combinations of the rules:

preferentially splitting the first overall folding multiple to the convolution kernel width dimension;

preferentially splitting the first overall folding multiple to a direction with a small convolution stride;

averagely splitting the first overall folding multiple to the convolution kernel width direction and the convolution kernel height direction; or splitting the first overall folding multiple to minimize the size of the convolution kernel of the first folding filter.

Article A35. The method of any one of articles A32-A34, further including: determining, by the processing circuit, the convolution stride of the first folding filter as follows:

$$S'_x = S_x * Nw1,$$

$$S'_y = S_y * Nh1,$$

where $S_x$ is a horizontal convolution stride of the original filter, $S_y$ is a vertical convolution stride of the original filter, $S_x$' is a horizontal convolution stride of the first folding filter, and $S_y$' is a vertical convolution stride of the first folding filter.

Article A36. The method of any one of articles A32-A35, further including: determining, by the processing circuit, the size of the convolution kernel of the first folding filter as follows:

$$k'_w = k_w + (Nw1 - 1) * S_x,$$

$$k'_h = k_h + (Nh1 - 1) * S_y,$$

where $S_x$ is the horizontal convolution stride of the original filter, $S_y$ is the vertical convolution stride of the original filter, $k_w$ is a convolution kernel width of the original filter, $k_h$ is a convolution kernel height of the original filter, $k_w$' is a convolution kernel width of the first folding filter, and $k_h$' is a convolution kernel height of the first folding filter.

Article A37. The method of any one of articles A31-A36, where the second threshold Aco is determined based on a count of convolution operation units in the processing circuit, and the first threshold A1≤Aco/2.

Article A38. The method of any one of articles A28-A37, where a size of an input channel dimension of the original filter does not exceed a third threshold A2, and a size of an input channel dimension of the folding filter equals a fourth threshold Aci, where the third threshold A2 is less than the fourth threshold Aci.

Article A39. The method of article A38, further including: performing, by the processing circuit, the second dimension folding as follows:

- determining a second overall folding multiple $N_{total2}$ based on a size Ci of an input channel dimension of to-be-folded multi-dimensional data and the fourth threshold Aci;
- splitting the second overall folding multiple $N_{total2}$ to a second width dimension folding multiple Nw2 and a second height dimension folding multiple Nh2;
- determining a width dimension size and a height dimension size of folded multi-dimensional data based on Nw2, Nh2, and a width dimension size and a height dimension size of the to-be-folded multi-dimensional data; and
- determining a folded convolution stride of the convolution operation based on Nw2, Nh2, and an original convolution stride of the convolution operation.

Article A40. The method of article A39, further including: determining, by the processing circuit, the second overall folding multiple $N_{total2}$ as follows:

$N_{total2}$=Aci/Cia, where Cia is a value that Ci is aligned to the nearest value of Aci/$2^n$, and n is a natural number.

Article A41. The method of any one of articles A39-A40, further including: splitting, by the processing circuit, the second overall folding multiple $N_{total1}$ according to any one of following rules or combinations of the rules:

- preferentially splitting the second overall folding multiple to the width dimension;
- averagely splitting the second overall folding multiple to the width dimension and the height dimension;
- splitting the second overall folding multiple to make a completion amount caused by alignment of folding multiples as small as possible; or
- splitting the second overall folding multiple to make a convolution stride based on a width dimension of the first folding filter be divisible by a folding multiple of the width dimension.

Article A42. The method of any one of articles A39-A41, further including: determining, by the processing circuit, the width dimension size and the height dimension size of the folded multi-dimensional data as follows:

$$k''_w = k_{wa}/Nw2, \quad (7)$$

$$k''_h = k_{ha}/Nh2, \quad (8)$$

where $k_w$" is the width dimension size of the folded multi-dimensional data, $k_h$" is the height dimension size of the folded multi-dimensional data, $k_{wa}$ is a value that a width dimension size $k_w$' of the to-be-folded multi-dimensional data is aligned to the nearest value of the width dimension folding multiple Nw2, and $K_{ha}$ is a value that a height dimension size $k_h$' of the to-be-folded multi-dimensional data is aligned to the nearest value of the height dimension folding multiple Nh2.

Article A43. The method of any one of articles A39-A42, further including: determining, by the processing circuit, a convolution stride of the folded multi-dimensional data as follows:

$$S''_x = \begin{cases} 1, & \text{if } S'_x/N_w2 < 1 \\ S'_x/Nw2, & \text{others} \end{cases}, \quad (9)$$

$$S''_y = \begin{cases} 1, & \text{if } S'_y/Nh2 < 1 \\ S'_y/Nh2, & \text{others} \end{cases}, \quad (10)$$

where $S_x$' is a convolution stride of a width dimension of a convolution operation before the second dimension folding, $S_y$' is a convolution stride of a height dimension of the convolution operation before the second dimension folding, $S_x$" is a convolution stride of a width dimension of a convolution operation after the second dimension folding, and $S_y$" is a convolution stride of a height dimension of the convolution operation after the second dimension folding.

Article A44. The method of any one of articles A39-A43, where the to-be-folded multi-dimensional data is the first folding filter and/or the input feature map.

Article A45. The method of any one of articles A38-A44, where the fourth threshold Aci is determined based on an instruction alignment requirement, and the third threshold A2≤Aci/2.

Article A46. The method of any one of articles A28-A45, where performing the dimension anti-folding on the intermediate result includes:

performing dimensional recombination on the intermediate result to implement the dimension anti-folding to obtain the output feature map when the extended filters only include extended filters obtained by moving in the convolution kernel width direction.

Article A47. The method of any one of articles A28-A45, where performing the dimension anti-folding on the intermediate result includes:

performing dimensional transposition on the intermediate result to implement the dimension anti-folding to obtain the output feature map when the extended filters include extended filters obtained by moving in the convolution kernel height direction.

Article A48. The method of any one of articles A28-A45, where performing the dimension anti-folding on the intermediate result includes:

performing dimensional recombination and dimensional transposition on the intermediate result to implement the dimension anti-folding to obtain the output feature map when the extended filters include extended filters obtained by moving in the convolution kernel width direction and extended filters obtained by moving in the convolution kernel height direction.

Article A49. The method of article A47 or article A48, where performing the dimensional transposition on the intermediate result includes:

transposing a feature on an output channel dimension of the intermediate result to the height dimension.

Article A50. The method of any one of articles A28-A49, further including:

realizing, by the processing circuit, the second dimension folding in the width dimension through the dimensional recombination; and/or realizing, by the processing circuit, the second dimension folding in the height dimension through the dimensional transposition.

Article A51, The method of any one of articles A28-A50, where the size of the input channel dimension of the original filter equals the size of the input channel dimension of the first folding filter; and the size of the output channel dimension of the first folding filter equals the size of the output channel dimension of the folding filter.

Article A52. The method of any one of articles A28-A51, where the folding filter is generated offline or online.

Article B1. A data processing apparatus for executing a neural network model, including:

a storage circuit configured to store a folding filter of a convolution layer of the neural network model, where the folding filter is synthesized by a plurality of extended filters obtained by moving an original filter by convolution stride by for many times; and a processing circuit configured to:

perform a convolution operation on an input feature map by using the folding filter to obtain an intermediate result; and perform dimensional rearrangement on the intermediate result to obtain an output feature map.

Article B2. The data processing apparatus of article B1, where the folding filter is generated by the processing circuit by:

moving the original filter by horizontal convolution stride for Nw−1 times in a convolution kernel width direction, and/or moving the original filter by vertical convolution stride for Nh−1 times in a convolution kernel height direction, to obtain N extended filters, where N=Nw×Nh, and Nw and Nh are natural numbers; and synthesizing the N extended filters into one folding filter in an output channel dimension.

Article B3. The data processing apparatus of article B2, where an output channel count of the original filter does not exceed a first threshold Th1, and an output channel count of the folding filter equals a second threshold Th2, where the first threshold Th1 is less than the second threshold Th2.

Article B4. The data processing apparatus of article B3, where the processing circuit is further configured to:

determine an overall folding multiple N based on the output channel count Co of the original filter and the second threshold Th2;

split the overall folding multiple N to a folding multiple Nw in the convolution kernel width direction and a folding multiple Nh in the convolution kernel height direction;

determine a convolution stride of the folding filter based on Nw, Nh, and a convolution stride of the original filter; and determine a size of a convolution kernel of the folding filter based on Nw, Nh, and a convolution kernel and the convolution stride of the original filter, where the size of the convolution kernel of the folding filter corresponds to a size of a convolution kernel of an extended filter.

Article B5. The data processing apparatus of article B4, where the processing circuit is further configured to determine the overall folding multiple N as follows:

N=Th2/Ca, where Ca is a value that Co is aligned to the nearest value of $Th2/2^n$, and n is a natural number.

Article B6. The data processing apparatus of any one of articles B4-B5, where the processing circuit is further configured to split the overall folding multiple N according to any one of following rules or combinations of the rules:

preferentially splitting the overall folding multiple N to the convolution kernel width dimension;

preferentially splitting the overall folding multiple N to a direction with a small convolution stride;

averagely splitting the overall folding multiple N to the convolution kernel width direction and the convolution kernel height direction; or splitting the overall folding multiple N to minimize the size of the convolution kernel of the folding filter.

Article B7. The data processing apparatus of any one of articles B4-B6, where the processing circuit is further configured to determine the convolution stride of the folding filter as follows:

$$S_x' = S_x * Nw,$$

$$S_y' = S_y * Nh,$$

where $S_x$ is a horizontal convolution stride of the original filter, $S_y$ is a vertical convolution stride of the original filter, $S_x'$ is a horizontal convolution stride of the folding filter, and $S_y'$ a vertical convolution stride of the folding filter.

Article B8. The data processing apparatus of any one of articles B4-B7, where the processing circuit is further configured to determine the size of the convolution kernel of the folding filter as follows:

$$k_w' = k_w + (Nw - 1) * S_x,$$

$$k_h' = k_h + (Nh - 1) * S_y,$$

where $S_x$ is the horizontal convolution stride of the original filter, $S_y$ is the vertical convolution stride of the original filter, $k_w$ is a convolution kernel width of the original filter, $k_h$ is a convolution kernel height of the original filter, $k_w'$ is a convolution kernel width of the folding filter, and $k_h'$ is a convolution kernel height of the folding filter.

Article B9. The data processing apparatus of any one of articles B1-B8, where the processing circuit is further configured to:

perform dimensional recombination on the intermediate result to obtain the output feature map when extended filters only include extended filters obtained by moving the original filter in the convolution kernel width direction.

Article B10. The data processing apparatus of any one of articles B1-B8, where the processing circuit is further configured to:

perform dimensional transposition on the intermediate result to obtain the output feature map when extended filters include extended filters obtained by moving the original filter in the convolution kernel height direction.

Article B11. The data processing apparatus of any one of articles B1-B8, where the processing circuit is further configured to:

perform dimensional recombination and dimensional transposition on the intermediate result to obtain the output feature map when extended filters include extended filters obtained by moving the original filter in the convolution kernel width direction and extended filters obtained by moving the original filter in the convolution kernel height direction.

Article B12. The data processing apparatus of article B10 or article B11, where the processing circuit is further configured to:

transpose a feature on an output channel dimension of the intermediate result to the height dimension.

Article B13. The data processing apparatus of any one of articles B3-B12, where the second threshold Th2 is determined based on a count of convolution operation units in the processing circuit, and the first threshold Th1≤Th2/2.

Article B14. The data processing apparatus of any one of articles B1-B13, where the input channel count of the original filter equals the input channel count of the folding filter.

Article B15. The data processing apparatus of any one of articles B1-B14, where the folding filter is generated offline or online.

Article B16. A chip, including the data processing apparatus of any one of articles B1-B15.

Article B17. A board card, including the chip of article B16.

Article B18. A method for executing a neural network model, which is implemented by a data processing apparatus, where the data processing apparatus includes a storage circuit and a processing circuit, and the method includes:

performing, by the processing circuit, a convolution operation on an input feature map by using a folding filter of a convolution layer of the neural network model storage circuit to obtain an intermediate result, where the folding filter is synthesized by a plurality of extended filters obtained by moving an original filter by convolution stride by for many times; and performing, by the processing circuit, dimensional rearrangement on the intermediate result to obtain an output feature map.

Article B19. The method of article B18, where the folding filter is generated by the processing circuit by:

moving the original filter by horizontal convolution stride for Nw−1 times in a convolution kernel width direction, and/or moving the original filter by vertical convolution stride for Nh−1 times in a convolution kernel height direction, to obtain N extended filters, where N=Nw×Nh, and Nw and Nh are natural numbers; and synthesizing the N extended filters into one folding filter in an output channel dimension.

Article B20. The method of article B19, where an output channel count of the original filter does not exceed a first threshold Th1, and an output channel count of the folding filter equals a second threshold Th2, where the first threshold Th1 is less than the second threshold Th2.

Article B21. The method of article B20, further including:

determining an overall folding multiple N based on the output channel count Co of the original filter and the second threshold Th2;

splitting the overall folding multiple N to a folding multiple Nw in the convolution kernel width direction and a folding multiple Nh in the convolution kernel height direction;

determining a convolution stride of the folding filter based on Nw, Nh, and a convolution stride of the original filter; and determining a size of a convolution kernel of the folding filter based on Nw, Nh, and a convolution kernel and the convolution stride of the original filter, where the size of the convolution kernel of the folding filter corresponds to a size of a convolution kernel of an extended filter.

Article B22. The method of article B21, further including:

determining, by the processing circuit, the overall folding multiple N as follows:

N=Th2/Ca, where Ca is a value that Co is aligned to the nearest value of Th2/2", and n is a natural number.

Article B23. The method of any one of articles B21-B22, further including:

splitting, by the processing circuit, the overall folding multiple N according to any one of following rules or combinations of the rules:

preferentially splitting the overall folding multiple N to the convolution kernel width dimension;

preferentially splitting the overall folding multiple N to a direction with a small convolution stride;

averagely splitting the overall folding multiple N to the convolution kernel width direction and the convolution kernel height direction; or splitting the overall folding multiple N to minimize the size of the convolution kernel of the folding filter.

Article B24. The method of any one of articles B21-B23, further including:

determining, by the processing circuit, the convolution stride of the folding filter as follows:

$$S_x' = S_x * Nw,$$

$$S_y' = S_y * Nh,$$

where $S_x$ is a horizontal convolution stride of the original filter, $S_y$ is a vertical convolution stride of the original filter, $S_x'$ is a horizontal convolution stride of the folding filter, and $S_y'$ is a vertical convolution stride of the folding filter.

Article B25. The method of any one of articles B21-B24, further including:

determining, by the processing circuit, the size of the convolution kernel of the folding filter as follows:

$$k'_w = k_w + (Nw - 1) * S_x,$$

$$k'_h = k_h + (Nh - 1) * S_y,$$

where $S_x$ is the horizontal convolution stride of the original filter, $S_y$ is the vertical convolution stride of the original filter, $k_w$ is a convolution kernel width of the original filter, $k_h$ is a convolution kernel height of the original filter, $k_w'$ is a convolution kernel width of the folding filter, and $k_h'$ is a convolution kernel height of the folding filter.

Article B26. The method of any one of articles B18-B25, where performing the dimensional rearrangement on the intermediate result includes:

performing dimensional recombination on the intermediate result to obtain the output feature map when extended filters only include extended filters obtained by moving the original filter in the convolution kernel width direction.

Article B27. The method of any one of articles B18-B25, where performing the dimensional rearrangement on the intermediate result includes:

performing dimensional transposition on the intermediate result to obtain the output feature map when extended filters include extended filters obtained by moving the original filter in the convolution kernel height direction.

Article B28. The method of any one of articles B18-B25, where performing the dimensional rearrangement on the intermediate result includes:

performing dimensional recombination and dimensional transposition on the intermediate result to obtain the output feature map when extended filters include extended filters obtained by moving the original filter in the convolution kernel width direction and extended filters obtained by moving the original filter in the convolution kernel height direction.

Article B29. The method of article B27 or article B28, where performing the dimensional transposition on the intermediate result includes:

transposing a feature on an output channel dimension of the intermediate result to the height dimension.

Article B30. The method of any one of articles B20-B29, where the second threshold Th2 is determined based on a count of convolution operation units in the processing circuit, and the first threshold Th1≤Th2/2.

Article B31. The method of any one of articles B18-B30, where the input channel count of the original filter equals the input channel count of the folding filter.

Article B32. The method of any one of articles B18-B31, where the folding filter is generated offline or online.

Although a plurality of embodiments of the present disclosure have been shown and described in this specification, it is obvious to those skilled in the art that such embodiments are provided only by example. Those skilled in the art may think of many modifying, altering, and substituting methods without deviating from the thought and spirit of the present disclosure. It should be understood that various alternatives to the embodiments of the present disclosure described herein may be adopted in the practice of the present disclosure. The attached claims are intended to limit the scope of protection of the present disclosure and therefore to cover equivalents or alternatives within the scope of these claims.

What is claimed is:

1. A data processing apparatus for executing a neural network model, comprising:

a storage circuit configured to store a folding filter of a convolution layer of the neural network model, wherein the folding filter is obtained by dimension folding of an original filter, wherein the dimension folding comprises rearranging data of a width dimension and/or a height dimension to an input channel dimension; and a processing circuit configured to:

perform the dimension folding on an input feature map to obtain a folding feature map; and perform a convolution operation on the folding feature map by using the folding filter to obtain an output feature map.

2. The data processing apparatus of claim 1, wherein a size of an input channel dimension of the original filter does not exceed a first threshold A1, and a size of an input channel dimension of the folding filter equals a second threshold Aci, wherein the first threshold A1 is less than the second threshold Aci.

3. The data processing apparatus of claim 2, wherein the processing circuit is configured to perform the dimension folding by:

determining an overall folding multiple $N_{total}$ based on a size Ci of an input channel dimension of to-be-folded multi-dimensional data and the second threshold Aci;

splitting the overall folding multiple $N_{total}$ into a width dimension folding multiple Nw and a height dimension folding multiple Nh;

determining a width dimension size and a height dimension size of folded multi-dimensional data based on Nw, Nh, and a width dimension size and a height dimension size of the to-be-folded multi-dimensional data; and determining a folded convolution stride of the convolution operation based on Nw, Nh, and an original convolution stride of the convolution operation.

4. The data processing apparatus of claim 3, wherein the processing circuit is further configured to determine the overall folding multiple $N_{total}$ as follows:

$N_{total}$=Aci/Cia, wherein Cia is a value that Ci is aligned to the nearest value of Aci/$2^n$, and n is a natural number.

5. The data processing apparatus of claim 3, wherein the processing circuit is further configured to split the overall folding multiple $N_{total}$ according to any one of following rules or combinations of the rules:

preferentially splitting the overall folding multiple $N_{total}$ to the width dimension;

averagely splitting the overall folding multiple $N_{total}$ to the width dimension and the height dimension;

splitting the overall folding multiple $N_{total}$ to make a completion amount caused by alignment of folding multiples as small as possible; or splitting the overall folding multiple $N_{total}$ to make a convolution stride in the width dimension be divisible by a folding multiple of the width dimension.

6. The data processing apparatus of claim 3, wherein the processing circuit is further configured to determine the width dimension size and the height dimension size of the folded multi-dimensional data as follows:

$$k'_w = k_{wa}/Nw, \quad (7)$$

$$k'_h = k_{ha}/Nh, \quad (8)$$

wherein $k_w'$ is the width dimension size of the folded multi-dimensional data, $k_h'$ is the height dimension size of the folded multi-dimensional data, $k_{wa}$ is a value that a width dimension size $k_w$ of the to-be-folded multi-dimensional data is aligned to the nearest value of the width dimension folding multiple Nw, and $k_{ha}$ is a value that a height dimension size $k_h$ of the to-be-folded multi-dimensional data is aligned to the nearest value of the height dimension folding multiple Nh.

7. The data processing apparatus of claim 3, wherein the processing circuit is further configured to determine a convolution stride of the folded multi-dimensional data as follows:

$$S_x' = \begin{cases} 1, & \text{if } S_x/N_w < 1 \\ S_x/Nw, & \text{others} \end{cases}, \quad (9)$$

$$S_y' = \begin{cases} 1, & \text{if } S_y/Nh < 1 \\ S_y/Nh, & \text{others} \end{cases}, \quad (10)$$

wherein $S_x$ is a convolution stride of an original width dimension of the convolution operation, $S_y$ is a convolution stride of an original height dimension of the convolution operation, $S_x'$ is a convolution stride of a folded width dimension of the convolution operation, and $S_y'$ is a convolution stride of a folded height dimension of the convolution operation.

8. The data processing apparatus of claim 3, wherein the second threshold Aci is determined based on an instruction alignment requirement, and the first threshold A1≤Aci/2.

9. The data processing apparatus of claim 1, wherein the processing circuit is further configured to:

implement the dimension folding in the width dimension through dimensional recombination; and/or implement the dimension folding in the height dimension through dimensional transposition.

10. The data processing apparatus of claim 1, wherein a size of an output channel dimension of the original filter equals a size of an output channel dimension of the folding filter.

11. The data processing apparatus of claim 1, wherein the folding filter is generated offline or online.

12. A chip, characterized in that it comprises a data processing apparatus, the data processing apparatus comprising:

a storage circuit, configured to store a folding filter of a convolution layer of the neural network model, wherein the folding filter is obtained by dimension folding of an original filter, wherein the dimension folding comprises rearranging data of a width dimension and/or a height dimension to an input channel dimension; and a processing circuit, configured to:

perform the dimension folding on an input feature map to obtain a folding feature map; and perform a convolution operation on the folding feature map by using the folding filter to obtain an output feature map.

13. The chip of claim 12, wherein a size of an input channel dimension of the original filter does not exceed a first threshold A1, and a size of an input channel dimension of the folding filter equals a second threshold Aci, wherein the first threshold A1 is less than the second threshold Aci.

14. The chip of claim 13, wherein the processing circuit is configured to perform the dimension folding by:

determining an overall folding multiple $N_{total}$ based on a size Ci of an input channel dimension of to-be-folded multi-dimensional data and the second threshold Aci;

splitting the overall folding multiple $N_{total}$ into a width dimension folding multiple Nw and a height dimension folding multiple Nh;

determining a width dimension size and a height dimension size of folded multi-dimensional data based on Nw, Nh, and a width dimension size and a height dimension size of the to-be-folded multi-dimensional data; and determining a folded convolution stride of the convolution operation based on Nw, Nh, and an original convolution stride of the convolution operation.

15. The chip of claim 14, wherein the processing circuit is further configured to determine the overall folding multiple $N_{total}$ as follows:

$N_{total}$=Aci/Cia, wherein Cia is a value that Ci is aligned to the nearest value of Aci/$2^n$, and n is a natural number.

16. The chip of claim 14, wherein the processing circuit is further configured to split the overall folding multiple $N_{total}$ according to any one of following rules or combinations of the rules:

preferentially splitting the overall folding multiple $N_{total}$ to the width dimension;

averagely splitting the overall folding multiple $N_{total}$ to the width dimension and the height dimension;

splitting the overall folding multiple $N_{total}$ to make a completion amount caused by alignment of folding multiples as small as possible; or splitting the overall folding multiple $N_{total}$ to make a convolution stride in the width dimension be divisible by a folding multiple of the width dimension.

17. The chip of claim 14, wherein the processing circuit is further configured to determine the width dimension size and the height dimension size of the folded multi-dimensional data as follows:

$$k_w' = k_{wa}/Nw, \quad (7)$$

$$k_h' = k_{ha}/Nh, \quad (8)$$

wherein $k_w'$ is the width dimension size of the folded multi-dimensional data, $k_h'$ is the height dimension size of the folded multi-dimensional data, $k_{wa}$ is a value that a width dimension size $k_w$ of the to-be-folded multi-dimensional data is aligned to the nearest value of the width dimension folding multiple Nw, and $k_{ha}$ is a value that a height dimension size $k_h$ of the to-be-folded multi-dimensional data is aligned to the nearest value of the height dimension folding multiple Nh.

18. The chip of claim 14, wherein the processing circuit is further configured to determine a convolution stride of the folded multi-dimensional data as follows:

$$S_x' = \begin{cases} 1, & \text{if } S_x/N_w < 1 \\ S_x/Nw, & \text{others} \end{cases}, \quad (9)$$

$$S_y' = \begin{cases} 1, & \text{if } S_y/Nh < 1 \\ S_y/Nh, & \text{others} \end{cases}, \quad (10)$$

wherein $S_x$ is a convolution stride of an original width dimension of the convolution operation, $S_y$ is a convolution stride of an original height dimension of the convolution operation, $S_x'$ is a convolution stride of a folded width dimension of the convolution operation, and $S_y'$ is a convolution stride of a folded height dimension of the convolution operation.

19. The chip of claim 14, wherein the second threshold Aci is determined based on an instruction alignment requirement, and the first threshold A1≤Aci/2.

20. The chip of claim 12, wherein the processing circuit is further configured to:

implement the dimension folding in the width dimension through dimensional recombination; and/or implement the dimension folding in the height dimension through dimensional transposition.

* * * * *